(12) United States Patent
Galbraith et al.

(10) Patent No.: US 10,628,054 B2
(45) Date of Patent: *Apr. 21, 2020

(54) RAID ARRAY SYSTEMS AND OPERATIONS USING MAPPING INFORMATION

(71) Applicant: International Business Machines Corporation, Armonk, NY (US)

(72) Inventors: Robert Galbraith, Rochester, NY (US); Andrew D. Walls, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/687,412

(22) Filed: Apr. 15, 2015

(65) Prior Publication Data

US 2016/0246678 A1   Aug. 25, 2016

Related U.S. Application Data

(63) Continuation of application No. 14/627,401, filed on Feb. 20, 2015.

(51) Int. Cl.
*G06F 3/06* (2006.01)
*G06F 11/10* (2006.01)

(52) U.S. Cl.
CPC .......... *G06F 3/0619* (2013.01); *G06F 3/064* (2013.01); *G06F 3/0665* (2013.01); *G06F 3/0688* (2013.01); *G06F 3/0689* (2013.01); *G06F 11/108* (2013.01); *G06F 11/1092* (2013.01); *G06F 11/1096* (2013.01);

(Continued)

(58) Field of Classification Search
CPC .......................... G06F 3/0619; G06F 11/1092
See application file for complete search history.

(56) References Cited

U.S. PATENT DOCUMENTS 6,526,477 B1 * 2/2003 Yuan ..................... G06F 3/061
710/52
7,711,897 B1    5/2010 Chatterjee et al.
(Continued)

OTHER PUBLICATIONS

Anonymous; "A method to balance the life cycles of SSD members within RAID arrays"; An IP.com Prior Art Database Technical Disclosure; http://ip.com/IPCOM/000212659; Nov. 22, 2011, 4 pages.

(Continued)

*Primary Examiner* — Ryan Bertram
(74) *Attorney, Agent, or Firm* — Patterson + Sheridan, LLP

(57) ABSTRACT

An apparatus may include a redundant array of independent disks (RAID) array including a plurality of solid state drives (SSDs). The apparatus may further include a RAID array controller coupled to the plurality of SSDs. The RAID array controller may be configured to determine whether one or more logical block addresses (LBAs) of a stripe of the RAID array are unmapped. The one or more LBAs may be associated with one or more SSDs of the plurality of SSDs. The RAID array controller may be configured to determine data corresponding to the stripe based on the determination of whether the one or more LBAs are unmapped. RAID operations (such has Rebuild, Exposed Mode Read, and/or Parity Resync operations) may be optimized based on the knowledge of which LBAs are mapped and unmapped.

18 Claims, 4 Drawing Sheets

(52) U.S. Cl.
CPC ............... *G06F 2212/1024* (2013.01); *G06F 2212/1032* (2013.01); *G06F 2212/214* (2013.01); *G06F 2212/262* (2013.01); *G06F 2212/7201* (2013.01)

(56) References Cited

U.S. PATENT DOCUMENTS

| | | | | |
|---|---|---|---|---|
| 2003/0237019 A1* | 12/2003 | Kleiman | ............. | G06F 11/1092 714/6.32 |
| 2006/0123312 A1* | 6/2006 | Forhan | ................ | G06F 11/1092 714/758 |
| 2007/0002482 A1* | 1/2007 | Daikokuya | ........... | G06F 3/0619 360/53 |
| 2011/0029728 A1 | 2/2011 | Popovski et al. | | |
| 2011/0093674 A1* | 4/2011 | Frame | ................... | G06F 12/023 711/162 |
| 2011/0145528 A1 | 6/2011 | Watanabe et al. | | |
| 2011/0231594 A1 | 9/2011 | Sugimoto et al. | | |
| 2013/0042052 A1 | 2/2013 | Colgrove | | |
| 2013/0262796 A1* | 10/2013 | Tomaszewski | ......... | G06F 3/061 711/156 |
| 2013/0290608 A1* | 10/2013 | Nelogal | ................ | G06F 3/0608 711/103 |
| 2014/0032834 A1 | 1/2014 | Cudak et al. | | |
| 2014/0250315 A1 | 9/2014 | Stenfort | | |
| 2016/0170846 A1* | 6/2016 | Hands | ................. | G06F 11/1662 714/6.3 |
| 2016/0188424 A1* | 6/2016 | Walls | ................. | G06F 11/1662 714/6.3 |
| 2016/0234296 A1* | 8/2016 | Zucca | ................ | H04L 67/1008 |
| 2016/0246518 A1 | 8/2016 | Galbraith et al. | | |

OTHER PUBLICATIONS

Anonymous; "Method of Spare Rotation to Extend SSD Life in RAID Subsystem while Maintaining Data Redundancy"; An IP.com Prior Art Database Technical Disclosure; http://ip.com/IPCOM/000212661; Nov. 22, 2011, 3 pages.

Anonymous; "Performance Enhancement Technique for SSD RAIDs Under Rebuild"; An IP.com Prior Art Database Technical Disclosure; http://ip.com/IPCOM/000233965; Jan. 6, 2014, 5 pages.

List of IBM Patents or Patent Applications Treated as Related.

* cited by examiner

RAID ARRAY SYSTEMS AND OPERATIONS USING MAPPING INFORMATION

CROSS REFERENCE TO RELATED APPLICATIONS

This application is a continuation application of and claims priority from U.S. patent application Ser. No. 14/627,401, entitled "RAID ARRAY SYSTEMS AND OPERATIONS USING MAPPING INFORMATION," filed on Feb. 20, 2015, which is incorporated herein by reference in its entirety.

FIELD OF THE DISCLOSURE

The present disclosure generally relates to computing memory, and more particularly to managing data within RAID arrays.

BACKGROUND

A redundant array of independent disks (RAID) array may partition data sets into stripe units (e.g., strips) allocated (e.g., in a round-robin fashion) in a stripe on disks of the RAID array. When a hard disk drive (HDD) or solid state drive (SSD) fails in a RAID array that provides redundancy (e.g. a RAID-5 array), the RAID array may be rebuilt using either a replacement or a hot spare device. The rebuild operation may be performed by locking each parity stripe of the RAID array (preventing other Read/Write commands to the array from updating the "strip" of data on each of the array members), recreating the data for the failed device, and writing the recreated data to the device being rebuilt. For RAID-5 arrays, data may be recreated by reading and XOR'ing data from each of the array members except for the device being rebuilt. Until the rebuild operation completes, the RAID array may remain unprotected against another device failure. Thus, it may be desirable for a rebuild operation to complete in as timely a manner as possible.

However, a rebuild operation may be time consuming (e.g., it may take several hours to complete) depending upon factors such as the capacity of the devices, the amount of concurrent read/write activity from the host, the speed of the devices and device interface, and the DRAM bandwidth of the RAID adapter. For example, rebuilding devices which are several terabytes (TB) in size concurrent with host read/write activity on a RAID adapter with a few gigabytes (GB) per second of DRAM bandwidth may require many hours to complete. While there was hope that the introduction of FLASH based storage devices (SSDs) would result in much faster rebuild times, a rebuild operation for an array of SSDs may be no faster than for an array of HDDs given that the bottleneck is often the bandwidth of the device interface (e.g. SAS, SATA, etc.) or the DRAM limitations of the RAID adapter. As the capacity of SSDs now look to overtake that of HDDs, improvements to the rebuild process may be needed to keep RAID levels like RAID-5 viable.

SUMMARY

In a particular embodiment, a method includes determining whether one or more logical block addresses (LBAs) of a stripe of a redundant array of independent disks (RAID) array are unmapped. The one or more LBAs are associated with one or more solid state drives (SSDs) of the RAID array. The method includes determining data corresponding to the stripe based on the determination of whether the one or more LBAs are unmapped. In some embodiments, the method may include determining data corresponding to the stripe without reading data of the stripe from one or more source SSDs based on the determination of whether the one or more LBAs are unmapped.

In a particular embodiment, a storage device includes a RAID array including a plurality of SSDs. The storage device further includes a RAID array controller coupled to the plurality of SSDs. The RAID array controller is configured to determine whether one or more LBAs of a stripe of the RAID array are unmapped. The one or more LBAs are associated with one or more SSDs of the plurality of SSDs. The RAID array controller is configured to determine data corresponding to the stripe based on the determination of whether the one or more LBAs are unmapped. In some embodiments, the storage device may be configured to determine data corresponding to the stripe without reading data of the stripe from one or more source SSDs based on the determination of whether the one or more LBAs are unmapped.

In a particular embodiment, a computer readable storage medium includes instructions, that when executed by a processor, cause the processor to determine whether one or more LBAs of a stripe of a RAID array are unmapped. The one or more LBAs may be associated with one or more SSDs of a plurality of SSDs. The instructions, when executed by the processor, further cause the processor to determine data corresponding to the stripe based on the determination of whether the one or more LBAs are unmapped.

One particular advantage provided by at least one of the disclosed embodiments is improved data processing performance. For example, a speed of a rebuild operation may be increased by reducing a number of SSD reads performed during the rebuild operation. Other aspects, advantages, and features of the present disclosure will become apparent after a review of the entire application, including the following sections: Brief Descriptions of the Drawings, Detailed Description, and the Claims.

DETAILED DESCRIPTION

Figure 1:
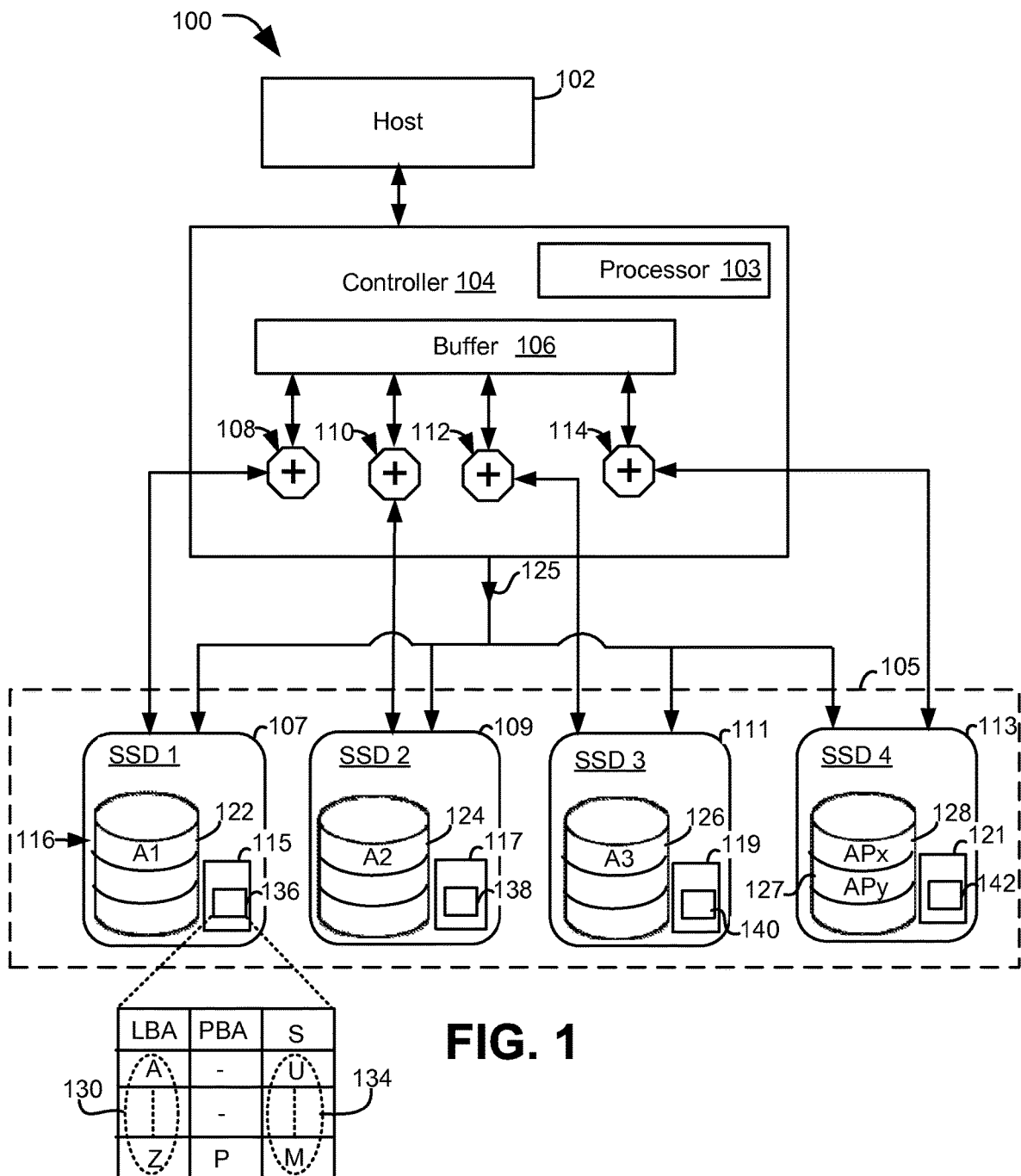
FIG. 1 is a block diagram of an apparatus configured in a RAID-5 configuration to determine data of a stripe based on a mapping status of LBAs of the stripe.

RAID storage systems generally subdivide solid state drive (SSD) array storage capacity into distinct partitions referred to as logical units (e.g., a stripe set of a RAID array). Each logical unit may be managed in accordance with a selected RAID management technique. Most RAID storage systems provide access to a logical unit in storage units referred to as logical blocks. A logical block may be a set of data bytes accessed and referenced as a unit. Each logical unit may be presented as a sequence of logical blocks referenced by logical block addresses (LBAs) and may be referred to as a logical block unit. Depending on the RAID management level associated with the logical block unit, the LBAs may be mapped or translated into corresponding physical block numbers—physical locations on the SSDs (e.g., using a logical-to-physical table (LPT) on the disk drives).

There may be only one LBA per physical block or there may be more than one LBA per physical block. For LBAs that are mapped, there is a known relationship between the LBA and one or more physical blocks that contain user data and/or protection information, if any. For LBAs that are unmapped, the relationship between the LBA and a physical block may not be defined. A physical block may be allocated when an LBA on a logical unit (that supports logical block provisioning management) transitions from a deallocated state to the mapped state and may be deallocated when an LBA on the logical unit transitions from the mapped state to the deallocated state.

When an SSD is formatted (e.g., using a Small Computer System Interface (SCSI) "Format Unit" command), the entire LPT may be initialized such that all LBAs are unmapped. When an SCSI initiator reads an LBA that is unmapped, the SSD may return all zeros for the block without actually reading any data from memory. For example, in SCSI architecture, when the LBPRZ bit of a Read Capacity or Inquiry Page 0xB2 command is set, a SSD may return zeroed data for any logical block that is deallocated (e.g., using an UNMAP command). An initial write to the SSDs may map an LBA while subsequent writes may update the mapping. A host may also unmap individual LBAs, or ranges of LBAs, by use of UNMAP or Write Same with UNMAP commands.

As XOR'ing data with zeroes will not change the result of the XOR operation, the RAID array controller 104 may not need to read data at LBAs that are unmapped in order to perform a resync operation, a rebuild operation, or an exposed mode read operation. For example, as described below, when all source LBAs are unmapped, the RAID array controller 104 may be able to avoid performing any read-XOR operations since it is known the XOR product will be zeros. In addition, when all source LBAs are unmapped and all destination LBAs are already unmapped there may be no need to perform any operation to a parity SSD. Alternatively, when the destination has mapped LBAs, the LBAs may be unmapped in order to create zeros. The more Reads-XORs and Writes that are avoided due to having unmapped LBAs, the less bandwidth that may be used on the device interfaces and for the RAID adapter's DRAM. This avoidance may improve the time to complete a rebuild, resync, or exposed mode operation. The performance improvement for a rebuild operation may depend on how many of the LBAs in the RAID array are unmapped. A rebuild operation that is performed when few or none of the LBAs in the RAID array are mapped (e.g., have been written) may experience a greater performance improvement than when the rebuild operation is performed when most or all LBAs of the RAID array are mapped.

FIG. 1 illustrates an information handling system (e.g., a storage device) 100 that may use a RAID-5 configuration. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that may store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, the information handling system 100 includes a host adapter 102, a RAID array controller 104, and a RAID array 105. The RAID array 105 includes storage mediums (e.g., material on which data is stored). In some examples, the storage mediums may be solid-state drives (SSDs). For example, the storage mediums may include a first SSD 107, a second SSD 109, a third SSD 111, and a fourth SSD 113. Although the RAID array 105 is illustrated as including four SSDs, the RAID array 105 may include less than four SSDs (e.g., 2 SSDs or 3 SSDs) or more than four SSDs.

The host adapter 102 may represent a data storage adapter of information handling system 100. The host adapter 102 may be configured to operate to receive data storage and retrieval requests from the information handling system 100 and to provide the requests to RAID array controller 104. As such, the host adapter 102 is configured to receive requests from the information handling system 100 in a protocol associated with the information handling system 100, and to provide the requests to the RAID array controller 104 in a protocol associated with the RAID array controller 104. For example, the host adapter 102 may include a front-end interface such as a Peripheral Component Interconnect (PCI) interface, a PCI-X interface, a PCI-Express (PCIe) interface, or another front-end interface, and a back-end interface such as an AT attach (ATA) interface, a Parallel-ATA (PATA) interface, a Serial-ATA (SATA) interface, a Small Computer System Interface (SCSI) interface, a Serial Attach-SCSI (SAS) interface, a Fibre Channel interface, or another back-end interface. The host adapter 102 may include a device on a main-board of information handling system 100, an add-in card of the information handling system, an external device, another data storage adapter, or a combination thereof.

The RAID array controller 104 may be configured to operate to receive data storage and retrieval requests from the host adapter 102, and to manage disk storage devices such as the SSDs 107, 109, 111, and 113. In particular, the RAID array controller 104 may be configured to operate to combine the SSDs 107, 109, 111, and 113 into the RAID array 105. In this way, the host adapter 102 makes data storage and retrieval requests that are directed to the RAID array 105, and the RAID array controller 104 distributes the requests among the SSDs 107, 109, 111, and 113. As illustrated, the RAID array controller 104 operates the RAID array 105 in a RAID 5 configuration using block level striping and with parity information distributed across the SSDs 107, 109, 111, and 113. RAID 5 is used in FIG. 1 for illustrative purposes, and the systems and methods described are not intended to be limited to RAID 5 applications only, but may be applied to other parity-based RAID levels, such as RAID 0 or RAID-10 (aka RAID 1+0).

The RAID array controller 104 is configured to receive requests from the host adapter 102 and to provide the requests to the SSDs 107, 109, 111, and 113 in a common protocol associated with the back-end protocol of the host adapter. For example, the RAID array controller 104 may include front-end and back-end interfaces such as ATA interfaces, PATA interfaces, SATA interfaces, SAS interfaces, SCSI interfaces, Fibre Channel interfaces, or other front-end and back-end interfaces.

The RAID array controller 104 may maintain one or more data structures that correlate a stripe of the RAID array 105 with corresponding LBAs. In some examples, the stripe may correspond to a collection of 256 kilobyte (KB) stripe unites (e.g., strips) stored on each of the SSDs 107, 109, 111, and 113. In some examples, each strip of a stripe of the RAID array 105 may be at the same LBAs for each of the SSDs 107, 109, 111, and 113. To illustrate, the stripe 116 may be formed of a data strip 122 (e.g., a 256 KB strip) at LBAs W-X of the first SSD 107, a data strip 124 (e.g., a 256 KB strip) at LBAs W-X of the second SSD 109, a data strip 126 (e.g., a 256 KB strip) at LBAs W-X of the third SSD 111, and a parity strip 128 (e.g., a 256 KB strip) at LBAs W-X of the fourth SSD 113. In these examples, the RAID array controller 104 may maintain a table correlating the stripe 116 with the LBAs W-X of the SSDs 107, 109, 111, and 113.

Alternatively, a stripe of the RAID array 105 may not be at the same LBAs for each of the SSDs 107, 109, 111, and 113. To illustrate, the stripe 116 may be formed of the data strip 122 at LBAs W-X of the first SSD 107, the data strip 124 at LBAs W-X of the second SSD 109, the data strip 126 at LBAs W-X of the third SSD 111, and the parity strip 127 at LBAs Y-Z of the fourth SSD 113. In these examples, the parity strip 127 may correspond to the exclusive-OR (XOR) of the data strips 122, 124, and 126. In these examples, the RAID array controller 104 may maintain a table correlating the stripe 116 with the LBAs W-X of the SSDs 107, 109, 111, and with the LBAs Y-Z of the fourth SSD 113.

The logical view presented to the host adapter 102 and to an operating system of the information handling system 100 may differ significantly from the physical storage of the data in the stripes on the SSDs 107, 109, 111, and 113. This may be due to the characteristics of the solid state storage devices that make up SSDs 107, 109, 111, and 113, and the control of data storage within the SSDs 107, 109, 111, and 113. For example, a controller on SSDs 107, 109, 111, and 113 may place data within contiguous physical blocks when data is first provided to the SSDs 107, 109, 111, and 113, but due to factors such as wear leveling and garbage collection, the data may move to different physical blocks over time. In order to represent the data stored on the SSDs 107, 109, 111, and 113 in the same logical view as it was provided to the SSDs by the operating system, the SSDs 107, 109, 111, and 113 may each include an SSD controller 115, 117, 119, and 121, respectively. The SSD controllers 115, 117, 119, and 121 may each maintain an updated map between LBAs and the physical blocks where the data is stored on the SSDs 107, 109, 111, and 113.

The SSD controllers 115, 117, 119, and 121 may also maintain a status indicating whether LBAs are mapped or are unmapped. For example, the SSD controller 115 may include an LPT table 136 that includes a status representing whether LBAs W-X of the first SSD 107 are mapped or are unmapped. As an example, the LPT table 136 illustrates entries 134 in column "S" that may indicate whether corresponding LBAs 130 (e.g., entries in same row of column "LBA") are unmapped "U" or mapped "M". Similarly, the SSD controller 117 may maintain a status representing whether LBAs W-X of the second SSD 109 are mapped or are unmapped (e.g., in LPT table 138), the SSD controller 119 may maintain a status representing whether LBAs W-X of the third SSD 111 are mapped or are unmapped (e.g., in LPT table 140), and the SSD controller 119 may maintain a status representing whether LBAs W-X or Y-Z of the fourth SSD 113 are mapped or are unmapped (e.g., in LPT table 142).

The RAID array controller 104 may be configured to determine whether one or more LBAs of a stripe that are associated with one or more SSDs of the RAID array 105 are unmapped. For example, when the stripe 116 is being rebuilt, the RAID array controller 104 may determine whether one or more LBAs of the stripe 116 that are associated with the first SSD 107 are unmapped, whether one or more LBAs of the stripe 116 that are associated with the second SSD 109 are unmapped, whether one or more LBAs of the stripe that are associated with the third SSD 111 are unmapped, and whether one or more LBAs of the stripe that are associated with the fourth SSD 113 are unmapped.

In some examples, the RAID array controller 104 may be configured to query the SSDs 107, 109, 111, and 113 to determine whether a region of multiple stripes includes unmapped blocks. Alternatively or additionally, the RAID array controller 104 may be configured to query the SSDs 107, 109, 111, and 113 to determine whether a specific LBA range (e.g., a 256 KB LBA range) being rebuilt contains all unmapped blocks. In some examples, the SSDs 107, 109, 111, and 113 may be configured to operate in an SCSI protocol. In these examples, the RAID array controller 104 may be configured to determine whether one or more LBAs of a stripe are unmapped by issuing a command 125 (e.g., a 'GetLBAStatus' command) to the SSDs 107, 109, 111, and 113 that identifies addresses corresponding to the one or more LBAs of the stripe.

For example, to determine whether one or more LBAs of the stripe 116 associated with the first SSD 107 (e.g., the LBAs W-X of the first SSD 107) are unmapped, the RAID array controller 104 may issue a GetLBAStatus command identifying the LBAs W-X of the first SSD 107. The first SSD 107 (e.g., the SSD controller 115) may process the GetLBAStatus (e.g., by accessing LPT table 136) to determine whether the LBAs W-X of the first SSD 107 are unmapped. For example, in response to receiving a GetLBAStatus command identifying LBAs W-X, the SSD controller 115 may access the LPT table 136, determine that LBAs W-X are unmapped (or unmapped) based on a corresponding mapping indicator (e.g., "U" may correspond to unmapped and "M" may correspond to mapped) associated with the LBAs W-X in the LPT table 136, and may send the RAID array controller 104 a query response indicating that the LBAs W-X of the first SSD 107 are mapped (or unmapped) based on the mapping indicator associated with the LBAs. The RAID array controller 104 may determine whether the LBAs W-X of the first SSD 107 are mapped or unmapped based on the query response from the first SSD 107. For example, the RAID array controller 104 may determine that the LBAs W-X of the first SSD 107 are mapped when the query response from the first SSD 107 indicates that the LBAs W-X of the first SSD 107 are mapped.

The RAID array controller 104 may determine whether the one or more LBAs associated with the stripe 116 and the second SSD 109 (e.g., the LBAs W-X of the second SSD 109) are unmapped by issuing the GetLBAStatus command identifying the LBAs W-X of the second SSD 109. The SSD controller 117 of the second SSD 109 may process the GetLBAStatus to determine whether the LBAs W-X of the second SSD 109 are mapped or unmapped as described above, and may send the RAID array controller 104 a query response indicative of whether the LBAs W-X of the second SSD 109 are unmapped. The RAID array controller 104 may determine whether the LBAs W-X of the second SSD 109 are mapped or unmapped based on the query response from the second SSD 109.

The RAID array controller 104 may determine whether the one or more LBAs associated with the stripe 116 and the third SSD 111 (e.g., the LBAs W-X of the third SSD 111) are unmapped by issuing the GetLBAStatus command identifying the LBAs W-X of the third SSD 111. The SSD controller 119 of the third SSD 111 may process the GetLBAStatus to determine whether the LBAs W-X of the third SSD 111 are unmapped, and may send the RAID array controller 104 a query response indicative of whether the LBAs W-X of the third SSD 111 are unmapped. The RAID array controller 104 may determine whether the LBAs W-X of the third SSD 111 are mapped or unmapped based on the query response from the third SSD 111.

The RAID array controller 104 may determine whether the one or more LBAs associated with the stripe 116 and the fourth SSD 113 (e.g., the LBAs W-X of the fourth SSD 113 or the LBAs Y-Z of the fourth SSD 113 as described above) are unmapped by issuing the GetLBA Status command identifying the LBAs W-X of the fourth SSD 113 or the LBAs Y-Z of the fourth SSD 113 (as described above depending on the striping scheme). The SSD controller 121 of the fourth SSD 113 may process the GetLBAStatus to determine whether the LBAs W-X of the fourth SSD 113 or the LBAs Y-Z of the fourth SSD 113 (as described above depending on the striping scheme) are unmapped, and may send the RAID array controller 104 a query response indicative of whether the LBAs W-X of the fourth SSD 113 or the LBAs Y-Z of the fourth SSD 113 (as described above depending on the striping scheme) are unmapped. Thus, the RAID array controller 104 may determine whether one or more LBAs of the stripe 116 that are associated with one or more of the SSDs 107, 109, 111, and 113 are unmapped by issuing a GetLBAStatus command.

In some examples, the RAID array controller 104 may be configured to perform a Format Unit for each of the SSDs 107, 109, 111, and 113 when the RAID array controller 104 creates the RAID array 105. Performing the Format Unit may ensure that all LBAs that are not written to will be discovered as being unmapped. Additionally or alternatively, the RAID array controller 104 may be configured to perform the Format Unit operation when a replacement or hot spare SSD is used during a rebuild operation to ensure that all blocks are discovered as unmapped. Thus, the RAID array controller 104 may enhance the chances of finding unmapped LBAs on each of the SSDs by performing the Format Unit process.

The information handling system 100 includes one or more XOR engines 108, 110, 112, and 114. The one or more XOR engines 108, 110, 112, and 114 may include on-the-fly hardware based XOR engines. The RAID array controller 104 may include a buffer 106 configured to store information as described below. The buffer 106 may be implemented using dynamic random-access memory (DRAM).

The RAID array controller 104 is configured to determine data corresponding to the stripe 116 based on the determination of whether the one or more LBAs of the stripe 116 are unmapped. For example, the RAID array controller 104 may be configured to determine data of the stripe 116 during a resync operation, a rebuild operation, or an exposed mode read operation without reading one or more of the SSDs 107, 109, 111, or 113 as described below.

Resync

During a resync operation, the RAID array controller 104 may synchronize parity information (of a stripe) associated with a parity SSD (e.g., a "destination SSD") based on data (of the stripe) associated with data SSDs (e.g., "source SSDs"). It is worth noting that the parity SSDs may change for each stripe of data and parity across the RAID array 105 such that parity information is not written to a dedicated SSD but is, instead, striped across all the SSDs. As any of the SSDs may store data or parity for a given stripe, the terms "data SSD" (e.g., source SSD) and "parity SSD" (e.g., destination SSD) are referential to a particular stripe. For example, the first SSD 107 may store data for stripe 116 and may store parity information for a different stripe, in which case the first SSD 107 may be a "data SSD" with reference to the stripe 116 and may be a "parity SSD" with reference to the different stripe. Purely for illustration purposes, in the following examples, the first, second, and third SSDs 107, 109, and 111 are treated as corresponding to data SSDs (e.g., source SSDs) and the fourth SSD 113 is treated as corresponding to a parity SSD (e.g., a destination SSD).

When the RAID array controller 104 has determined that no LBAs of a stripe are unmapped (e.g., by issuing a GetLBAStatus to the SSDs of the stripe and analyzing the query replies from the SSDs), the RAID array controller 104 may be configured to perform a resync of the stripe by reading and XOR'ing contents of source SSDs of the stripe to generate parity information for the stripe. For example, the RAID array controller 104 may be configured to perform a resync of the stripe 116 by reading and XOR'ing the contents of the data strips 122, 124, and 126 of the source SSDs 107, 109, and 111 (e.g., using the XOR engines 108, 110, and 112) to generate parity information for the stripe 116. The generated parity information may be written to a buffer 106 and/or to the destination SSD 113 (e.g., written to parity strip 127 or 128 of the stripe 116).

When the RAID array controller 104 has determined that one or more LBAs of a stripe that are associated with source SSDs are unmapped (e.g., by issuing a GetLBAStatus to the source SSDs of the stripe and analyzing the query replies from the source SSDs), the RAID array controller 104 may be configured to perform a resync of the stripe without reading one or more source SSDs of the RAID array 105. Following examples are presented to describe the resync operation in various situations, such as when only one source SSD is mapped, when multiple source SSDs are mapped, when all source SSDs are unmapped and the destination SSD is mapped, and when all source SSDs are unmapped and the destination SSD is unmapped.

We first turn to a situation in which the RAID array controller 104 has determined (e.g., using the GetLBAStatus command) that LBAs of the stripe that are associated with one source SSD are mapped and that the LBAs of the stripe that are associated with the remaining source SSDs are unmapped. In this situation, the RAID array controller 104 may determine parity information for the destination SSD without reading the source SSDs that are unmapped and without performing any XOR operations. To illustrate, consider an example in which the RAID array controller 104 has determined that LBAs of the stripe 116 that are associated with the first source SSD 107 and the second source SSD 109 are unmapped and that LBAs of the stripe 116 that are associated with the third source SSD 111 are mapped. To determine the parity information of the stripe 116 in this case, the RAID array controller 104 may initialize the buffer 106 to zeros. Based on the determination that LBAs of the stripe 116 that are associated with the third source SSD 111 are the only LBAs of the stripe 116 that are mapped and associated with a source SSD, the RAID array controller 104 may proceed as though data of the stripe 116 associated with the third source SSD 111 corresponds to parity information of the stripe 116. More particularly, the RAID array controller 104 may be configured to read data from the third source SSD 111 into the buffer 106 and to not read data from the first source SSD 107 and the second source SSD 111 into the buffer 106. Additionally, the RAID array controller 104 may be configured not to perform any XOR operations. The RAID array controller 104 may be configured to write the contents of the buffer 106 (corresponding to the data read from the third source SSD 113) to the destination SSD 113 (e.g., at LBAs corresponding to the parity strip 127 or the parity strip 128 as described above). Thus, data corresponding to the parity strip 127 or 128 (of the parity stripe 116) may be determined and the stripe 116 may be resynchronized without reading the first source SSD 107 and the second SSD source 109 and without performing any XOR operations on data of the stripe 116.

In some embodiments, the RAID array controller 104 may have determined (e.g., using the GetLBAStatus command) that LBAs of the stripe associated with multiple source SSDs are mapped and LBAs of the stripe associated with at least one source SSD are unmapped. In this situation, the RAID array controller 104 may determine parity information for the destination SSD without reading the at least one data source SSD that is unmapped. To illustrate, consider an example in which the RAID array controller 104 has determined (e.g., using the GetLBAStatus command) that LBAs of the stripe 116 that are associated with the first source SSD 107 are unmapped, that LBAs of the stripe 116 that are associated with the second source SSD 109 are mapped, and LBAs of the stripe 116 that are associated with the third source SSD 111 are mapped. To determine the parity information of the stripe 116 in this case, the RAID array controller 104 may initialize the buffer 106 to zeros. Based on the determination that the LBAs of the stripe 116 that are associated with the first source SSD 107 are unmapped, the RAID array controller 104 may be configured not to read data from the first source SSD 107 into the buffer 106. Based on the LBAs of the stripe 116 that are associated with the second source SSD 109 and the third source SSD 111 being mapped, the RAID array controller 104 may be configured to read and XOR data of the stripe 116 associated with the second source SSD 109 and the third source SSD 111. For example, the RAID array controller 104 may be configured to read data stored at physical blocks corresponding to the LBAs of the stripe 116 associated with the second source SSD 109 (e.g., "second source SSD data") and to write the second source SSD data to the buffer 106. The RAID array controller 104 may be configured to read data stored at physical blocks corresponding to the LBAs of the stripe 116 associated with the third source SSD 111 (e.g., "third source SSD data"), to XOR the second source SSD data with the third source SSD data using the on-the-fly XOR engine 114, and to store the XOR results in the buffer 106. The XOR results stored in the buffer 106 may correspond to parity information of the stripe 116. The RAID array controller 104 may write the contents of the buffer 106 (corresponding to the results of XOR'ing the second source SSD data with the third source SSD data) to the destination SSD 113. Thus, the parity strip 127 or 128 of the parity stripe 116 may be resynchronized without reading the first source SSD 107.

Although the reading and XOR'ing operations have been described above as occurring in a particular order, the associative nature of the XOR operations allows reading and XOR'ing to occur in any order. For example, the RAID array controller 104 may read the third source SSD data into the buffer 106, then read and XOR the second source SSD data with contents of the buffer 106 (e.g., the third source SSD data) using the on-the-fly XOR engine 112, store the results of the XOR operation in the buffer 106, and write the contents of the buffer 106 (e.g., the results of XOR'ing the second source SSD data with the third source SSD data) to the destination SSD 113.

In an embodiment, the RAID array controller 104 may have determined (e.g., using the GetLBAStatus command) that LBAs of the stripe associated with all of the source SSDs are unmapped. In this situation, the RAID array controller 104 may be configured to determine parity information without reading data of the stripe 116 from the source SSDs 107, 109, and 111, and without performing any XOR operations involving data of the stripe 116. Instead of reading and XOR'ing data of the stripe 116 from the source SSDs 107, 109, and 111, the RAID array controller 104 may determine that the parity information corresponds to all zeros based on the RAID array controller 104 determining that all of the LBAs associated with the source SSDs 107, 109, and 111 are unmapped. When all of the source SSDs are unmapped and the destination SSD is mapped, the RAID array controller 104 may be configured to issue a command (e.g., a deallocation command) to the destination SSD 113 to instruct the destination SSD 113 to deallocate the LBAs of the stripe 116. For example, when the SSDs of the array 105 operate in accordance with a SCSI protocol, the deallocation command may correspond to an UNMAP command that may be sent to inform the destination SSD 113 that LBAs associated with the deallocation command (e.g., LBAs of the stripe 116 that are associated with the destination SSD 113) should be deallocated. Additionally or alternatively, when all of the LBAs associated with the stripe 116 are unmapped, the RAID array controller 104 may be configured not to issue the deallocation command instructing the destination SSD 113 to deallocate the LBAs of the stripe 116 that are associated with the destination SSD 113. Thus, when all of the source SSDs are unmapped, the RAID array controller 104 may be configured to perform the re-sync operation without reading data of the stripe from the source SSDs 107, 109, and 111, and without writing data to physical blocks corresponding to LBAs of the stripe 116 that are associated with the destination SSD 109.

As disclosed herein, the SCSI UNMAP command is provided as an exemplary illustration of a deallocation command issued to cause an SSD to deallocate particular LBAs associated with a stripe, but the disclosure is not limited thereby, and that the teachings herein are also applicable within the ATA protocol or within other protocols for managing SSDs. For example, where the SSDs operate in accordance with an ATA protocol, the TRIM bit of the DATA SET MANAGEMENT command may be set to a logical one (1) to inform the SSDs that data blocks associated with the deallocation command may be deallocated.

Rebuild and Exposed Mode Read

During an exposed mode read operation, the RAID array controller 104 may receive a request (e.g., from the host) to provide stripe data. The stripe data may include a portion (e.g., a data strip) that is stored on a failed SSD (e.g., a "destination SSD") that has not been rebuilt. In order to provide the portion of the stripe data stored on the destination SSD, the RAID array controller 104 may be configured to facilitate or perform an exposed mode read operation involving the portion of the stripe data that is stored on the destination SSD. During the exposed mode operation, the RAID array controller 104 may be configured to determine the portion of the stripe data stored on the destination SSD. During a rebuild operation, an SSD being rebuilt (e.g., a "destination SSD") may be rebuilt by determining data corresponding to portions of stripes associated with the destination SSD.

Purely for illustration purposes, in the following examples, the second SSD 109 is treated as corresponding to the destination SSD (e.g., the second SSD 109 has failed and an exposed mode read operation is being performed or the second SSD 109 is being rebuilt during a rebuild operation) and the first SSD 107, the third SSD 111, and the fourth SSD 113 correspond to source SSDs (e.g., a first source SSD 107, a second source SSD 111, and a third source SSD 113).

When the RAID array controller 104 has determined (e.g., using the GetLBAStatus command) that no LBAs of the stripe are unmapped, the RAID array controller 104 may be configured to determine data of the stripe that is associated with a destination SSD by reading and XOR'ing contents of the stripe associated with source SSDs. To illustrate, consider an example in which the RAID array controller 104 has determined (e.g., using the GetLBAStatus command) that all of the source SSDs 107, 111, and 113 are mapped. In this example, the RAID array controller 104 may be configured to determine data of the stripe 116 associated with the destination SSD 109 by reading and XOR'ing contents of the source SSDs 107, 111, and 113 to generate the stripe data corresponding to the data of the stripe 116 associated with the destination SSD 109. For a rebuild operation, the RAID array controller 104 may be configured to write the generated stripe data to the destination SSD 109 (e.g., at LBAs associated with data strip 124). For an exposed mode read operation, the RAID array controller 104 may be configured to provide the generated stripe data to the host 102.

When the RAID array controller 104 has determined (e.g., using the GetLBAStatus command) that one or more LBAs of the stripe 116 are unmapped, the RAID array controller 104 may be configured to determine data of the stripe 116 without reading one or more source SSDs of the RAID array 105. Following examples are presented to describe performance of the rebuild and exposed mode operations in various situations, such as when only one source SSD is mapped, when multiple source SSDs are mapped, when all source SSDs are unmapped and the destination SSD is mapped, and when all source SSDs are unmapped and the destination SSD is unmapped.

We first turn to a situation in which the RAID array controller 104 has determined (e.g., using the GetLBAStatus command) that LBAs of the stripe associated with one source SSD are mapped and the remaining LBAs of the stripe associated with source SSDs are unmapped. In this situation, the RAID array controller 104 may determine data for the destination SSD without reading the source SSDs that are unmapped and without performing any XOR operations. To illustrate, consider an example in which the RAID array controller 104 has determined (e.g., using the GetLBAStatus command) that LBAs of the stripe 116 that are associated with the first source SSD 107 and the second source SSD 111 are unmapped and that LBAs of the stripe 116 that are associated with the third source SSD 113 are mapped. To determine the data of the stripe 116 in this case, the RAID array controller 104 may be configured to initialize the contents of the buffer 106 to zeros. Based on the determination that LBAs of the stripe 116 that are associated with the third source SSD 113 are the only LBAs of the stripe 116 that are mapped and associated with a source SSD, the RAID array controller 104 may be configured to proceed as though data of the stripe 116 associated with the third source SSD 113 corresponds to data of the stripe 116 associated with the destination SSD 109. More particularly, the RAID array controller 104 may be configured to read data from the third source SSD 113 into the buffer 106 and may be configured to not read data from the first source SSD 107 and the second source SSD 111 into the buffer 106. For a rebuild operation, the RAID array controller 104 may write the contents of the buffer 106 (corresponding to the data read from the third source SSD 113) to the destination SSD 109 (e.g., at LBAs corresponding to the data strip 124). For an exposed mode read operation, the RAID array controller 104 may provide the contents of the buffer 106 (corresponding to the data read from the third source SSD 113) to the host 102. Thus, data of the stripe 116 associated with a failed SSD or an SSD being rebuilt may be determined without reading multiple SSDs and without performing any XOR operations involving data of the stripe 116.

The RAID array controller 104 may have determined (e.g., using the GetLBAStatus command) that LBAs of the stripe that are associated with multiple source SSDs are mapped and LBAs of the stripe that are associated with at least one source SSD are unmapped. In this situation, the RAID array controller 104 may determine data for the destination SSD without reading the at least one source SSD that is unmapped. To illustrate, consider an example in which the RAID array controller 104 has determined (e.g., using the GetLBAStatus command) that LBAs of the stripe 116 that are associated with the first source SSD 107 are unmapped and that LBAs of the stripe 116 that are associated with the second source SSD 111 and with the third source SSD 113 are mapped. To determine the data of the stripe 116 in this case, the RAID array controller 104 may initialize the buffer 106 to zeros. Based on the determination that the LBAs of the stripe 116 that are associated with the first source SSD 107 are unmapped, the RAID array controller 104 may be configured not to read data from the first source SSD 107 into the buffer 106. Based on the LBAs of the stripe 116 that are associated with the second source SSD 111 and the third source SSD 113 being mapped, the RAID array controller 104 may read and XOR data of the stripe 116 associated with second source SSD 111 and the third source SSD 113. For example, the RAID array controller 104 may be configured to read data stored at physical blocks of the second source SSD 111 corresponding to the LBAs of the stripe 116 that are associated with the second source SSD 111 (e.g., "second source SSD data") and to store the second source SSD data in the buffer 106. The RAID array controller 104 may be configured to read data stored at physical blocks corresponding to the LBAs of the stripe 116 that are associated with the third source SSD 113 (e.g., "third source SSD data"), to XOR the second source SSD data with the third source SSD data using the on-the-fly XOR engine 114, and to write the XOR results in the buffer 106. The XOR results written to the buffer 106 may correspond to data of the stripe 116 associated with the destination SSD 109. For a rebuild operation, the RAID array controller 104 may write the contents of the buffer 106 (corresponding to the XOR results) to the destination SSD 109 (e.g., at LBAs corresponding to the data strip 124). For an exposed mode read operation, the RAID array controller 104 may provide the contents of the buffer 106 (corresponding to the XOR results) to the host 102. Thus, data of the stripe 116 associated with a failed SSD or an SSD being rebuilt may be determined without reading at least one source SSD.

Although the reading and XOR'ing operations have been described above as occurring in a particular order, the associative nature of the XOR operations allows reading and XOR'ing to occur in any order. For example, the RAID array controller 104 may read the third source SSD data into the buffer 106, then read and XOR the second source SSD data with contents of the buffer 106 (e.g., the third source SSD data) using the on-the-fly XOR engine 112, store the results of the XOR operation in the buffer 106, and write the contents of the buffer 106 (e.g., the result of XOR'ing the second source data with the third source data) to the destination SSD 109 or provide the contents of the buffer 106 to the host 102.

In an embodiment, the RAID array controller 104 may have determined (e.g., using the GetLBAStatus command) that LBAs of the stripe associated with all of the source SSDs are unmapped. In this situation, the RAID array controller 104 may be configured to determine data (of the stripe 116) corresponding to the destination SSD 109 without reading any of the source SSDs 107, 111, and 113 and without performing any XOR operations involving data of the stripe 116. Instead of reading and XOR'ing stripe data from the source SSDs 107, 111, and 113, the RAID array controller 104 may determine that data of the stripe 116 corresponds to all zeros based on the RAID array controller 104 determining that all of the LBAs associated with the source SSDs 107, 111, and 113 are unmapped.

For an exposed mode read operation, the RAID array controller 104 may provide the data of the stripe 116 (e.g., all zeros) to the host 102. Thus, the RAID array controller 104 may perform the exposed mode operation without reading and/or XOR'ing stripe data from any of the source SSDs 107, 111, and 113.

For the rebuild operation, when all of the source SSDs are unmapped and the destination SSD is mapped, the RAID array controller 104 may be configured to issue a command (e.g., a "deallocation command") to the destination SSD 109 instructing the SSD 109 to deallocate LBAs associated with the command (e.g., LBAs of the stripe 116 associated with the destination SSD 109). The deallocation command may correspond to the deallocation command described above. Additionally or alternatively, for the rebuild operation, when all of the LBAs associated with the stripe 116 are unmapped, the RAID array controller 104 may be configured not to issue a deallocation command. Thus, when all of the source SSDs are unmapped, the RAID array controller 104 may be configured to perform the rebuild operation without writing data to physical blocks corresponding to LBAs of the stripe 116 that are associated with the destination SSD 109.

Figure 2:
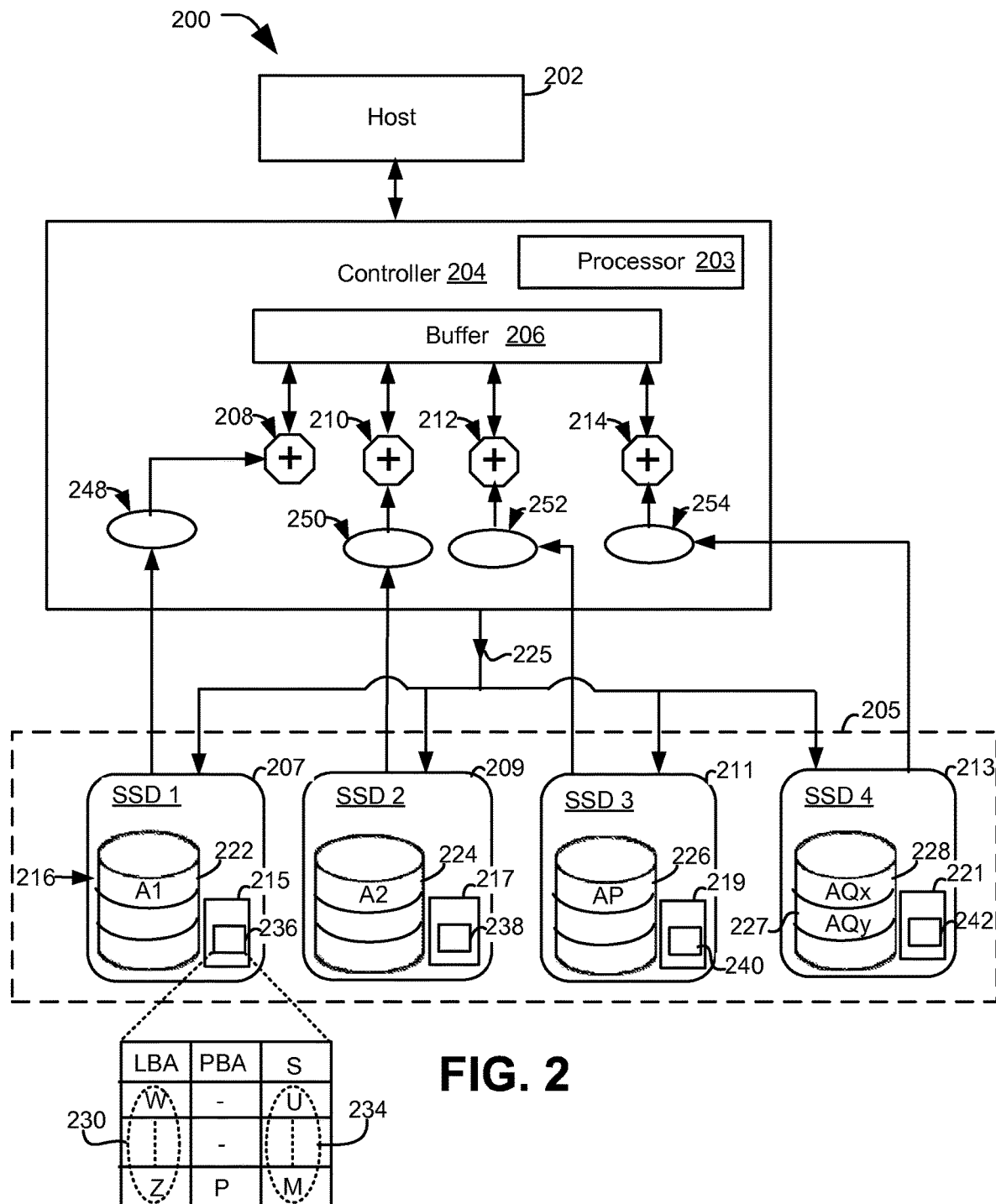
FIG. 2 is a block diagram of an apparatus configured in a RAID-6 configuration to determine data of a stripe based on a mapping status of LBAs of the stripe.

FIG. 2 illustrates an information handling system (e.g., a storage device) 200 that may use a RAID-6 configuration. In a particular embodiment, the information handling system 200 includes a host adapter 202, a RAID array controller 204, and a RAID array 205. The host adapter 202 may correspond to the host adapter 102 of FIG. 1 and may be configured to interact with the RAID array controller 204 as described above with reference to the RAID array controller 104 of FIG. 1. The RAID array 205 includes storage mediums (e.g., material on which data is stored). In some examples, the storage mediums may include a first SSD 207, a second SSD 209, a third SSD 211, and a fourth SSD 213 as described above with reference to the SSDs 107, 109, 111, and 113 of FIG. 1. Although the RAID array 205 is illustrated as including four SSDs, the RAID array 205 may include less than four SSDs (e.g., 2 SSDs or 3 SSDs) or more than four SSDs.

The RAID array controller 204 may be configured to operate to receive data storage and retrieval requests from the host adapter 202, and to manage disk storage devices such as the SSDs 207, 209, 211, and 213. In particular, the RAID array controller 204 may be configured to operate to combine the SSDs 207, 209, 211, and 213 into the RAID array 205. As illustrated, the RAID array controller 204 operates the RAID array 205 in a RAID 6 configuration using block level striping and with parity information distributed across the SSDs 207, 209, 211, and 213. The RAID array 205 stores data and ECC information in stripes across the SSDs 207, 209, 211, and 213. To illustrate, a stripe 216 may be formed of a data strip 222 at LBAs W-X of the first SSD 207, a data strip 224 at LBAs W-X of the second SSD 209, a P-strip (corresponding to P-parity as described below) 226 at LBAs W-X of the third SSD 211, and a Q-strip (corresponding to Q-parity as described below) 228 at LBAs W-X or a Q-strip 227 at LBAs Y-Z. The RAID array controller 204 may maintain one or more data structures that correlate a stripe of the RAID array 205 with corresponding LBAs.

The designation of RAID-6 has been used to describe RAID schemes that may withstand the failure of multiple disks without losing data through the use of multiple parity drives (commonly referred to as the "P" and "Q" drives) for redundancy and sophisticated ECC techniques. Although the term "parity" is used to describe the codes used in RAID-6 technologies, the codes are more accurately considered a type of ECC code rather than simply a parity code. The principles of RAID-6 may be used to recover a number of drive failures depending on the number of "parity" drives that are used. Some RAID-6 implementations are based upon Reed-Solomon algorithms, which depend on Galois Field arithmetic. A complete explanation of Galois Field arithmetic and the mathematics behind RAID-6 may be found in a variety of sources. The Galois Field arithmetic used in RAID-6 implementations takes place in GF(2N). This is the field of polynomials with coefficients in GF(2), modulo some generator polynomial of degree N. All the polynomials in this field are of degree N−1 or less, and their coefficients are all either 0 or 1, which means they may be represented by a vector of N coefficients all in {0,1}; that is, these polynomials "look" just like N-bit binary numbers. Polynomial addition in this field is simply N-bit XOR, which has the property that every element of the field is its own additive inverse, so addition and subtraction are the same operation. Polynomial multiplication in this field, however, may be performed with table lookup techniques based upon logarithms or with simple combinational logic.

Each RAID-6 check code (e.g., P-parity and Q-parity) expresses an invariant relationship, or equation, between the data of a stripe on the data disks of the RAID-6 array and the data on one or both of the parity disks. The check disks P and Q may change for each stripe of data and parity across the array such that parity data is not written to a dedicated disk but is, instead, striped across all the disks. As any of the SSDs may store data and parity for a given stripe, the terms "data disks" and "parity disks" are referential to a particular stripe. For example, the first SSD 207 may store data for stripe 216 and may store a check code (e.g., P-parity or Q-parity) for a different stripe, in which case the first SSD 207 may be a "data disk" with reference to the stripe 216 and may be a "parity disk" with reference to the other stripe. If there are C check codes and a set of F disks fail, F≤C, the failed disks may be reconstructed by selecting F of these equations and solving them simultaneously in GF(2N) for the F missing variables.

The SSDs 207, 209, 211, and 213 may each include an SSD controller 215, 217, 219, and 221, respectively. The SSD controllers 215, 217, 219, and 221 may each maintain an updated map between LBAs and the physical blocks where the data is stored on the SSDs 207, 209, 211, and 213 as described above with reference to the SSD controllers 115, 117, 119, and 121 of FIG. 1. For example, the SSD controllers 215, 217, 219, and 221 may maintain LPTs (e.g., the LPTs 236, 238, 240, and 242, respectively) that map LBAs to physical blocks of the SSDs 215, 217, 219, and 221. The SSD controllers 215, 217, 219, and 221 may also maintain a status indicating whether LBAs are mapped or are unmapped as described above with reference to FIG. 1. For example, the LPTs 236, 238, 240, and 242 may each include a status representing whether LBAs of the SSDs 207, 209, 211, and 213, respectively, are mapped or are unmapped as described above with reference to the LPTs 136, 138, 140, and 142 of FIG. 1. As an example, the LPT 236 illustrates entries 234 in column "S" of the LPT 236 that may indicate whether corresponding LBAs 230 (e.g., entries in same row of column "LBA") are unmapped "U" or mapped "M".

The RAID array controller 204 is configured to determine whether one or more LBAs of a stripe that are associated with one or more SSDs of the RAID array 205 are unmapped as described above with reference to FIG. 1. For example, when the stripe 216 is being rebuilt, the RAID array controller 204 may determine whether one or more LBAs of the stripe 216 that are associated with the first SSD 207 are unmapped, whether one or more LBAs of the stripe 216 that are associated with the second SSD 209 are unmapped, whether one or more LBAs of the stripe that are associated with the third SSD 211 are unmapped, and whether one or more LBAs of the stripe that are associated with the fourth SSD 213 are unmapped. In some examples, as described above with reference to FIG. 1, the SSDs 207, 209, 211, and 213 may be configured to operate in an SCSI protocol. In these examples, the RAID array controller 204 may be configured to determine whether one or more LBAs of a stripe are unmapped by issuing a command 225 (e.g., the 'GetLBAStatus' command) to the SSDs 207, 209, 211, and 213 that identifies addresses corresponding to the one or more LBAs of the stripe 216 as described above with reference to FIG. 1. The command 225 may correspond to the command 125 of FIG. 1.

In some examples, the RAID array controller 204 may be configured to perform a Format Unit for each of the SSDs 207, 209, 211, and 213 when the RAID array controller 204 creates the RAID array 205. Performing the Format Unit will ensure that all LBAs that are not written to will be discovered as being unmapped. Additionally or alternatively, the RAID array controller 204 may be configured to perform the Format Unit operation when a replacement or hot spare SSD is used during a rebuild operation to ensure that all blocks are discovered as unmapped. Thus, the RAID array controller 204 may enhance the chances of finding unmapped LBAs on each of the SSDs by performing the Format Unit process.

The information handling system 200 includes one or more XOR engines 208, 210, 212, and 214. The one or more XOR engines 208, 210, 112, and 214 may correspond to on-the-fly hardware based XOR engines as described above with reference to FIG. 1. The information handling system 200 also includes one or more finite field multipliers 248, 250, 252, and 254. The finite field multipliers 248, 250, 252, and 254 may be implemented as hardware inserted within the data path as data is retrieved from an SSD by the RAID array controller 204. The RAID array controller 204 may include a buffer 206 configured to store information as described below. The buffer 206 may correspond to the buffer 106 of FIG. 1.

The RAID array controller 204 is configured to determine data corresponding to the stripe 216 based on whether one or more LBAs of the stripe 216 are unmapped. For example, the RAID array controller 204 may be configured to determine data of the stripe 216 during a resync operation, a rebuild operation, or an exposed mode read operation without reading one or more of the SSDs 207, 209, 211, or 213 as described below.

Resync

During a resync operation, the RAID array controller 204 may synchronize parity information (of a stripe) associated with a parity SSD by generating parity information (e.g., P-parity information or Q-Parity information) based on data (of the stripe) associated with data SSDs. Purely for illustration purposes, in the following examples, the first and second SSDs 207 and 209 are treated as corresponding to data SSDs (e.g., source SSDs) and the SSD associated with the resync data being determined is treated as the destination SSD. For example, when the P-parity information is being determined for the stripe 216, the P-parity SSD 211 may correspond to the destination SSD, and when the Q-parity information is being determined for the stripe 216, the Q-parity SSD 213 may correspond to the destination SSD.

When the RAID array controller 204 has determined (e.g., using the GetLBAStatus command) that no LBAs of a stripe are unmapped, the RAID array controller 204 may be configured to perform a resync of the stripe by reading, scaling, and XOR'ing scaled contents of data strips of the stripe to generate parity information. For example, the RAID array controller 204 may be configured to perform a resync of the stripe 216 by reading data of the stripe 216 and performing appropriate calculations to determine the parity information. In some embodiments, the calculations may be performed by multiplying the data read from each of the data disks (e.g., the first SSD 207 and the second SSD 209) of the stripe 216 by an appropriate scaling coefficient using the on-the-fly finite field multipliers 248 and 250, respectively. The scaled data may be XOR'ed using the on-the-fly XOR engines 208 or 210 to determine the parity data. For example, the RAID array controller 204 may be configured to read data from the first SSD 207 into on-the-fly finite field multiplier 248, and the on-the-fly finite field multiplier 248 may be configured to multiply the data read from the first SSD 207 by a scaling coefficient. The RAID array controller 204 may be configured to write the scaled data (of the first SSD 207) from the on-the-fly finite field multiplier 248 to the buffer 206. The RAID array controller 204 may be configured to read data from the second SSD 209 into the on-the-fly finite field multiplier 250, and the on-the-fly finite field multiplier 250 may be configured to multiply the data from the second SSD 209 by a scaling coefficient. The on-the-fly XOR engine 250 may be configured to read and XOR the scaled data from the on-the-fly finite field multiplier 250 and the data in the buffer 206 (e.g., the scaled data from the first SSD 207). Depending on the scaling coefficient, the result of the XOR operation may correspond to resynchronized P-parity data or Q-parity for the stripe 216. The RAID array controller 204 may be configured to write the results of the XOR operation to the buffer 206 and/or to a corresponding destination SSD (e.g., the third SSD 211 or the fourth SSD 213). The above described operations may be performed twice using different scaling coefficients—once using a scaling coefficient corresponding to P-parity information and once using a scaling coefficient corresponding to Q-parity information.

When the RAID array controller 204 has determined (e.g., using the GetLBAStatus command) that one or more LBAs of a stripe that are associated with data source SSDs are unmapped, the RAID array controller 204 may be configured to perform a resync of the stripe (e.g., determine parity data of the parity strip of the stripe) without reading one or more SSDs of the RAID array 205. Following examples are presented to describe the resync operation in various situations in which at least one source SSD is unmapped, such as when only one source SSD is mapped, when all source SSDs are unmapped and the destination SSD is mapped, and when all source SSDs are unmapped and the destination SSD is unmapped.

We first turn to a situation in which the RAID array controller 204 has determined (e.g., using the GetLBAStatus command) that LBAs of the stripe associated with one source SSD are mapped and the remaining LBAs of the stripe associated with source SSDs are unmapped. In this situation, the RAID array controller 204 may determine parity information (e.g., corresponding to P-parity or Q-parity) without reading the source SSDs that are unmapped and without performing any XOR operations on data of the stripe 216. To illustrate, consider an example in which the RAID array controller 204 has determined (e.g., using the GetLBAStatus command) that LBAs of the stripe 216 that are associated with the first source SSD 207 are unmapped and that LBAs of the stripe 216 that are associated with the second source SSD 209 are mapped. To determine parity data of the stripe 216 in this case, the RAID array controller 204 may initialize the buffer 206 to zeros. Based on the determination that LBAs of the stripe 216 that are associated with the second source SSD 209 are the only LBAs (of the stripe 216) that are mapped and are associated with a source SSD, the RAID array controller 204 may be configured to consider appropriately scaled data (of the stripe 216) associated with the second source SSD 209 corresponds to the parity information being determined. More particularly, the RAID array controller 204 may be configured to read data from the second source SSD 209 into the finite field multiplier 250, and the finite field multiplier 250 may be configured to multiply the data from the second source SSD 209 by an appropriate scaling coefficient. The RAID array controller 204 may be configured to write the scaled data from the finite field multiplier 250 to the buffer 206 and not to read data from the first source SSD 207 into the buffer 206 or perform any XOR operations on the data of the stripe 216.

The RAID array controller 204 may write the contents of the buffer 206 (corresponding to the data read from the second source SSD 209 and scaled by the finite field multiplier 250) to a corresponding destination SSD (e.g., destination SSD 211 or destination SSD 213) depending on whether the determined data corresponds to P-parity information or Q-parity information. For example, where the scaling coefficient corresponds to P-parity data, the RAID array controller 204 may write the contents of the buffer 206 to the P-parity SSD 211, and when the scaling coefficient corresponds to Q-parity data, the RAID array controller 204 may write the contents of the buffer 206 to the Q-parity SSD 213. The above described operations may be performed twice using different scaling coefficients—once using a scaling coefficient corresponding to P-parity information and once using a scaling coefficient corresponding to Q-parity information. Thus, parity information of the parity stripe 216 may be determined and the stripe 216 may be resynchronized without reading the first SSD 207.

The RAID array controller 204 may have determined (e.g., using the GetLBAStatus command) that LBAs of the stripe associated with all of the source SSDs are unmapped. In this situation, the RAID array controller 204 may be configured to determine parity information without reading data of the stripe 216 from the source SSDs 207 and 209, and without performing any XOR or scaling operations involving data of the stripe 216. Instead of reading, scaling, and XOR'ing data of the stripe 216 from the source SSDs 207 and 209, the RAID array controller 204 may determine that the parity information corresponds to all zeros based on the RAID array controller 204 determining that all of the LBAs associated with the source SSDs 207 and 209 are unmapped. When the RAID array controller 204 has determined (e.g., using the GetLBAStatus command) that all of the source SSDs 207 and 209 are unmapped and the destination SSD (211 or 213) is mapped, the RAID array controller 204 may be configured to issue a deallocation command (e.g., as described above) to the destination SSD (211 or 213) instructing the destination SSD (211 or 213) to deallocate LBAs of the stripe 216 that are associated with the destination SSD (211 or 213). Additionally or alternatively, when the RAID array controller 204 has determined (e.g., using the GetLBAStatus command) that all of the LBAs associated with the stripe 216 are unmapped, the RAID array controller 204 may consider the resync operation to be complete and may be configured not to issue the deallocation command. Thus, when all of the source SSDs are unmapped, the RAID array controller 204 may be configured to perform the re-sync operation without reading data of the stripe from the source SSDs 207 and 209, and without writing data to physical blocks corresponding to LBAs of the stripe 216 that are associated with destination SSDs (e.g., SSDs 211 and 213).

Rebuild and Exposed Mode Read

We now turn to description of examples of rebuild and exposed mode read operations in a RAID-6 environment. During an exposed mode read operation, the RAID array controller 204 may receive a request (e.g., from the host) to provide stripe data. The stripe data may include a portion (e.g., a data strip) that is stored on a failed SSD (e.g., a "destination SSD") that has not been rebuilt. In order to provide the portion of the stripe data stored on the destination SSD, the RAID array controller 204 may be configured to facilitate or perform an exposed mode read operation involving the portion of the stripe data that is stored on the destination SSD. During the exposed mode operation, the RAID array controller 204 may be configured to determine the portion of the stripe data stored on the destination SSD. During a rebuild operation, an SSD being rebuilt (e.g., a "destination SSD") may be rebuilt by determining data corresponding to portions of stripes associated with the destination SSD.

Purely for illustration purposes, in the following examples, the second SSD 209 is treated as corresponding to the destination SSD (e.g., the second SSD 209 has failed and an exposed mode read operation is being performed or the second SSD 209 is being rebuilt during a rebuild operation) and the first SSD 207, the third SSD 211, and the fourth SSD 213 correspond to SSDs that have not failed and/or are not being rebuilt (e.g., a first source SSD 207, a second source SSD 211, and a third source SSD 213, respectively).

When the RAID array controller 204 has determined (e.g., using the GetLBAStatus command) that no LBAs of the stripe are unmapped, the RAID array controller 204 may be configured to determine data of the stripe that is associated with a destination SSD by reading contents of the stripe associated with source SSDs of the RAID array 205, scaling the data read from the source SSDs, and XOR'ing the scaled data. For example, the RAID array controller 204 may be configured to scale the data of the stripe 216 from the source SSDs by multiplying the data read from the source SSDs by an appropriate scaling coefficient using on-the-fly finite field multipliers. The scaled data may be XOR'ed to determine the data of the stripe 216 corresponding to the destination SSD. To illustrate, consider an example in which none of the LBAs of the stripe 216 that are associated with the source SSDs 207, 211, and 213 are unmapped. In this example, the RAID array controller 204 may be configured to determine data of the stripe 216 associated with the destination SSD 209 by reading data of the stripe 216 stored on the source SSDs 207, 211, and/or 213, scaling the data of the stripe 216 read from the source SSDs 207, 211, and/or 213 to generate scaled data (e.g., using the on-the-fly finite field multipliers 248, 252, and/or 254), and XOR'ing the scaled data (e.g., using the on-the-fly XOR engines 208, 212, and/or 214) to generate stripe data corresponding to the data of the stripe 216 associated with the destination SSD 209. The RAID array controller 204 may write the generated stripe data to the destination SSD 209 (e.g., during the rebuild operation) or may provide the generated stripe data to the host 202 (e.g., during the exposed mode read operation).

When the RAID array controller 204 has determined (e.g., using the GetLBAStatus command) that one or more LBAs of a stripe (e.g., that is the subject of an exposed mode read operation or that is being rebuilt) are unmapped, the RAID array controller 204 may be configured to determine data of the stripe without reading one or more SSDs of the RAID array 205. Following examples are presented to describe performance of the exposed mode read and/or rebuild operation in various situations, such as when only one source SSD is mapped, when multiple source SSDs are mapped, when all source SSDs are unmapped and the destination SSD is mapped, and when all source SSDs are unmapped and the destination SSD is unmapped.

The RAID array controller 204 may have determined (e.g., using the GetLBAStatus command) that LBAs of the stripe associated with one source SSD are mapped and the remaining LBAs of the stripe associated with source SSDs are unmapped. In this situation, the RAID array controller 204 may determine data for the destination SSD without reading the source SSDs that are unmapped and without performing any XOR operations. To illustrate, the RAID array controller 204 may have determined (e.g., using the GetLBAStatus command) that LBAs of the stripe 216 that are associated with the first source SSD 207 and the second source SSD 211 are unmapped and that LBAs of the stripe 216 that are associated with the third source SSD 213 are mapped. To determine data of the stripe 216 in this case, the RAID array controller 204 may initialize the buffer 206 to zeros. Based on the determination that LBAs of the stripe 216 that are associated with the third data source SSD 213 are the only LBAs (of the stripe 216) that are mapped and are associated with a source SSD, the RAID array controller 204 may proceed as though appropriately scaled data of the stripe 216 associated with the third SSD 213 corresponds to data of the stripe 216 associated with the destination SSD 209. More particularly, the RAID array controller 204 may be configured to read data from the third source SSD 213 into the finite field multiplier 254. The finite field multiplier 254 may be configured to scale the data from the third source SSD 213 by multiplying the data from the third source SSD 213 by an appropriate scaling coefficient. The RAID array controller 204 may be configured to write the scaled data from the finite field multiplier 254 to the buffer 206 and may be configured not to read data from the first and second source SSDs 207 and 211 into the buffer 206 or perform any scaling or XOR operations on the data of the stripe 216 read from the first and second source SSDs 207 and 211. For a rebuild operation, the RAID array controller 204 may write the contents of the buffer 206 (corresponding to the data read from the third source SSD 213 and scaled by the finite field multiplier 254) to the destination SSD 209 (e.g., at LBAs corresponding to the data strip 224). For an exposed mode read operation, the RAID array controller 204 may provide the contents of the buffer 206 (corresponding to the data read from the third source SSD 213 and scaled by the finite field multiplier 254) to the host 202. Thus, data of the parity stripe 216 associated with a failed SSD or an SSD being rebuilt may be determined without reading multiple source SSDs.

The RAID array controller 204 may have determined (e.g., using the GetLBAStatus command) that LBAs of the stripe associated with multiple source SSDs are mapped and LBAs of the stripe associated with at least one source SSD is unmapped. In this situation, the RAID array controller 204 may determine data for the destination SSD without reading the source SSD that is unmapped. To illustrate, consider an example in which the RAID array controller 204 has determined (e.g., using the GetLBAStatus command) that LBAs of the stripe 216 that are associated with the first source SSD 207 are unmapped and that LBAs of the stripe 216 associated with the second source SSD 211 and the third source SSD 213 are mapped. To determine data of the stripe 216 associated with the destination SSD 209 in this case, the RAID array controller 204 may initialize the buffer 206 to zeros. Based on the determination that LBAs of the stripe 216 that are associated with the first source SSD 207 are unmapped, the RAID array controller 204 may proceed as though scaling and XOR'ing data of the stripe 216 associated with the second source SSD 211 and the third source SSD 213 will produce the data of the stripe 216 associated with the destination SSD 209. More particularly, the RAID array controller 204 may be configured to read data of the stripe 216 from the second source SSD 211 into the finite field multiplier 252. The finite field multiplier 252 may be configured to multiply the data from the second source SSD 211 by an appropriate scaling coefficient to generate second source SSD scaled data. The RAID array controller 204 may be configured to write the second source SSD scaled data to the buffer 206.

The RAID array controller 204 may be configured to read data of the stripe 216 from the third source SSD 213 into the finite field multiplier 254. The finite field multiplier 254 may be configured to scale the data from the third source SSD 213 to generate third source SSD scaled data. The on-the-fly XOR engine 214 may be configured to XOR the third source SSD scaled data and the contents of the buffer 206 (e.g., the second source SSD scaled data) to generate data corresponding to data of the stripe 216 associated with the destination SSD 209 (e.g., to generate "destination SSD data"). The RAID array controller 204 may be configured to write the destination SSD data to the buffer 206. For a rebuild operation, the RAID array controller 204 may be configured to write the destination SSD data to the destination SSD 209 (e.g., at LBAs corresponding to the data strip 224). For an exposed mode read operation, the RAID array controller 204 may be configured to provide the destination SSD data to the host 202. Thus, data of the parity stripe 216 associated with a failed SSD or an SSD being rebuilt may be determined without reading the first SSD 207 of the RAID array 205.

Although the reading, scaling, and XOR'ing operations have been described above as occurring in a particular order, the associative nature of the XOR operations allows reading and XOR'ing to occur in any order. For example, the RAID array controller 204 may read the third source SSD scaled data into the buffer 206, read and XOR the second source SSD scaled data with contents of the buffer 206 (e.g., the third source SSD scaled data) using the on-the-fly XOR engine 212, store the results of the XOR operation in the buffer 206, and write the contents of the buffer 206 (e.g., the result of XOR'ing the second source data with the third source data) to the destination SSD 209 or provide the contents of the buffer 206 to the host 202.

The RAID array controller 204 may have determined (e.g., using the GetLBAStatus command) that LBAs of the stripe associated with all of the source SSDs are unmapped. In this situation, the RAID array controller 204 may be configured to determine data (of the stripe 216) corresponding to the destination SSD 209 without reading any of the source SSDs 207, 211, and 213 and without performing any scaling or XOR operations involving data of the stripe 216. Instead of reading, scaling, and XOR'ing stripe data from the source SSDs 207, 211, and 213, the RAID array controller 204 may determine that data of the stripe 216 corresponds to all zeros based on the RAID array controller 204 determining that all of the LBAs associated with the source SSDs 207, 211, and 213 are unmapped.

For an exposed mode read operation, the RAID array controller 204 may provide the data of the stripe 216 (e.g., all zeros) to the host 202. Thus, the RAID array controller 204 may perform the exposed mode operation without reading and/or XOR'ing stripe data from any of the source SSDs 207, 211, and 213.

For the rebuild operation, when all of the source SSDs are unmapped and the destination SSD is mapped, the RAID array controller 204 may be configured to issue a deallocation command to the destination SSD 209 instructing the destination SSD 209 to deallocate LBAs associated with the deallocation command (e.g., LBAs of the stripe 216 that are associated with the destination SSD 209). Additionally or alternatively, for the rebuild operation, when all of the LBAs associated with the stripe 216 are unmapped, the RAID array controller 204 may be configured not to issue a deallocation command. Thus, when all of the source SSDs are unmapped, the RAID array controller 204 may be configured to perform the rebuild operation without writing data to physical blocks corresponding to LBAs of the stripe 216 that are associated with the destination SSD 209.

Figure 3:
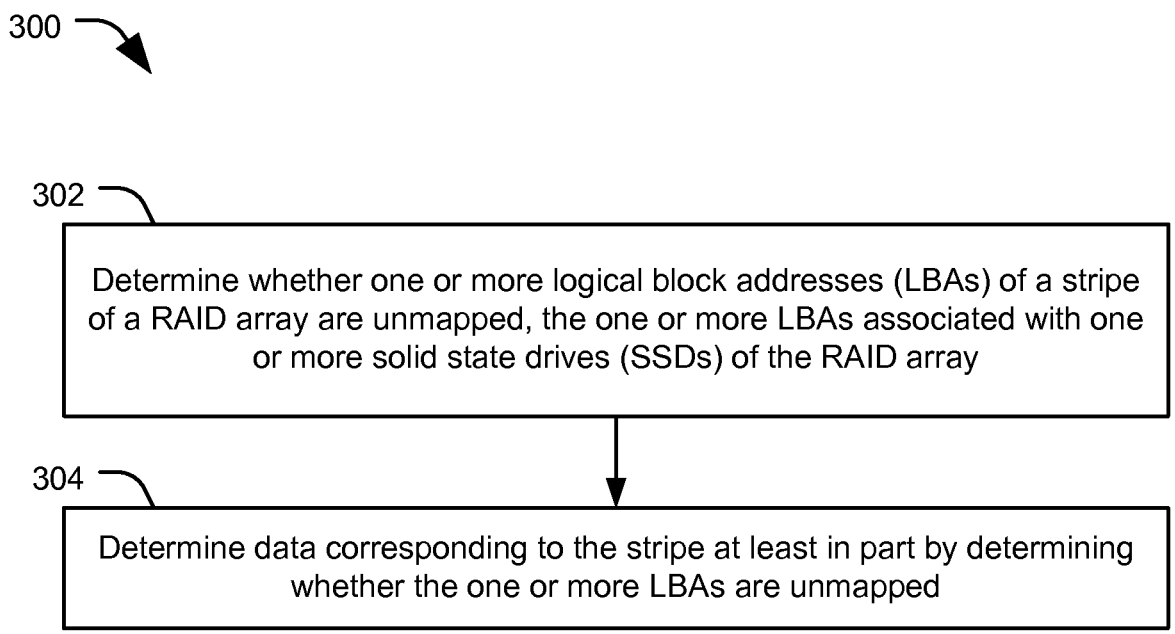
FIG. 3 is a flowchart to illustrate an embodiments of determining data of a stripe based on a mapping status of LBAs of the stripe.

Referring to FIG. 3, a first embodiment of a method 300 of operation determines data of a stripe based at least in part on whether LBAs of the stripe are unmapped. The method 300 may be executed by the information handling system 100 of FIG. 1 and/or the information handling system 200 of FIG. 2. The method 300 may be illustrated with reference to FIGS. 1-2.

The method 300 may include determining whether one or more logical block addresses (LBAs) of a stripe that are associated with one or more SSDs of a RAID array are unmapped. For example, the RAID array may be configured in a RAID-5 configuration as described above with reference to FIG. 1, and the RAID array controller 104 of FIG. 1 may determine whether one or more LBAs of the stripe 116 are unmapped. Alternatively, the RAID array may be configured in a RAID-6 configuration as described above with reference to FIG. 2, and the RAID array controller 204 of FIG. 2 may determine whether one or more logical LBAs of the stripe 216 are unmapped.

For example, as described above, the RAID array 105 of FIG. 1 or 205 of FIG. 2 may be configured in a SCSI configuration. In these examples, the RAID array controller 104 of FIG. 1, or the RAID array controller 204 of FIG. 2, may determine whether one or more LBAs of a stripe of the RAID array 105 or 205 are unmapped by issuing a GetLBAStatus command to corresponding SSDs as described above.

The method 300 further includes determining data corresponding to the stripe based on the determination of whether the one or more LBAs are unmapped. For example, the method 300 may further include determining data corresponding to the stripe based on the determination of whether the one or more LBAs are unmapped during a resync operation, a rebuild operation, or an exposed mode read operation, as described above.

For example, with reference to FIG. 1, during a resync operation involving a RAID array configured in a RAID-5 configuration, the RAID array controller 104 may determine data (parity information) corresponding to the stripe based on the determination of whether one or more LBAs of the stripe are unmapped. When the RAID array controller 104 has determined that no LBAs of a stripe are unmapped, the RAID array controller 104 may be configured to perform a resync of the stripe by reading and XOR'ing contents of source SSDs of the stripe to generate parity information for the stripe as described above.

Additionally or alternatively, as described above, when the RAID array controller 104 has determined that LBAs (e.g., LBAs W-X) of the stripe 116 that are associated with one source SSD 111 are mapped and that the LBAs (e.g., LBAs W-X) of the stripe 116 that are associated with the remaining source SSDs 107 and 109 are unmapped, the RAID array controller 104 may consider the data stored at the LBAs W-X of the of the mapped SSD 111 as corresponding to the parity information of the stripe 116. More particularly, when the RAID array controller 104 has determined that LBAs (e.g., LBAs W-X) of the stripe 116 that are associated with one source SSD 111 are mapped and that the LBAs (e.g., LBAs W-X) of the stripe 116 that are associated with the remaining source SSDs 107 and 109 are unmapped, the RAID array controller 104 may resync the stripe 116 by reading data of the stripe 116 from the mapped source SSD 111 and without reading data of the stripe 116 from the unmapped source SSDs 107 and 109. Thus, the RAID array controller 104 may determine parity information for a destination SSD without reading the source SSDs that are unmapped and without performing any XOR operations.

Additionally or alternatively, as described above, when the RAID array controller 104 has determined that LBAs (e.g., LBAs W-X) of the stripe 116 that are associated with multiple source SSDs 109 and 111 are mapped and LBAs (e.g., LBAs W-X) of the stripe 116 that are associated with at least one source SSD 107 are unmapped, the RAID array controller 104 may determine parity information for the destination SSD 113 without reading the at least one data source SSD 107 that is unmapped as described above. For example, the RAID array controller 104 may consider the parity information of the stripe 116 to correspond to the XOR of the mapped source SSDs 109 and 111. Thus, the RAID array controller 104 may determine data of the stripe 116 (resynced parity information of the stripe 116) by XOR'ing data of the stripe 116 stored at the mapped source SSDs 109 and 111 and without reading data of the stripe 116 stored at the unmapped source SSD 107.

Additionally or alternatively, when the RAID array controller 104 has determined that LBAs of the stripe 116 associated with all of the source SSDs 107, 109, and 111 are unmapped, the RAID array controller 104 may be configured to determine parity information without reading data of the stripe 116 from the source SSDs 107, 109, and 111, and without performing any XOR operations involving data of the stripe 116. Instead of reading and XOR'ing data of the stripe 116 from the source SSDs 107, 109, and 111, the RAID array controller 104 may determine that the parity information corresponds to all zeros based on the RAID array controller 104 determining that all of the LBAs associated with the source SSDs 107, 109, and 111 are unmapped. When all of the source SSDs are unmapped and the destination SSD is mapped, the RAID array controller 104 may be configured to issue an UNMAP command to the destination SSD 113. Additionally or alternatively, when all of the LBAs associated with the stripe 116 are unmapped, the RAID array controller 104 may be configured not to issue an UNMAP command. Thus, when all of the source SSDs are unmapped, the RAID array controller 104 may be configured to perform the re-sync operation without reading data of the stripe from the source SSDs 107, 109, and 111, and without writing data to physical blocks corresponding to LBAs of the stripe 116 that are associated with the destination SSD 113.

With reference to FIG. 2, during a resync operation involving a RAID array configured in a RAID-6 configuration, the RAID array controller 204 may synchronize parity information (of a stripe) associated with a parity SSD (e.g., a "destination SSD") based on data (of the stripe) associated with data SSDs as described above. When the RAID array controller 204 has determined (e.g., using the GetLBAStatus command) that no LBAs of a stripe are unmapped, the RAID array controller 204 may perform a resync operation of the stripe 216 by reading, scaling, and XOR'ing scaled contents of data strips of the stripe to generate parity information as described above.

Alternatively or additionally, when the RAID array controller 204 has determined that LBAs of the stripe associated with at least one source SSD are mapped and the remaining LBAs of the stripe associated with source SSDs are unmapped, the RAID array controller 204 may determine parity information (e.g., corresponding to P-parity or Q-parity) without reading the source SSDs that are unmapped. For example, when at least one source SSD is unmapped (e.g., when the first source SSD 207 is unmapped) and only one source SSD is mapped (e.g., the second source SSD 209 is mapped), the RAID array controller 204 may consider the parity information to correspond to appropriately scaled data of the stripe 116 at the second source SSD 209. Thus, when only one source SSD is mapped, the RAID array controller 204 may determine the parity information by scaling the data of the stripe stored in the mapped source SSD (e.g., the second source SSD 209) and without reading data of the stripe 116 from the unmapped source SSD (e.g., the first source SSD 207). As another example, when at least one source SSD is unmapped (e.g., when the first source SSD 207 is unmapped) and multiple source SSDs are mapped (e.g., the second source SSD 209 and a third source SSD [not illustrated] are mapped), the RAID array controller 204 may consider the parity information to correspond to XORs of appropriately scaled data of the stripe 116 at the mapped source SSDs. Thus, when multiple source SSDs are mapped, the RAID array controller 204 may determine the parity information by scaling and XOR'ing the data of the stripe stored in the mapped source SSDs (e.g., the second source SSD 209 and the third source SSD [not illustrated]) and without reading data of the stripe 116 from the unmapped source SSD (e.g., the first source SSD 207).

Alternatively or additionally, when the RAID array controller 204 has determined that LBAs of the stripe associated with all of the source SSDs are unmapped, the RAID array controller 204 may be configured to determine parity information without reading data of the stripe 216 from the source SSDs 207 and 209, and without performing any XOR or scaling operations involving data of the stripe 116. Instead of reading, scaling, and XOR'ing data of the stripe 116 from the source SSDs 207 and 209, the RAID array controller 204 may determine that the parity information corresponds to all zeros based on the RAID array controller 204 determining that all of the LBAs associated with the source SSDs 207 and 209 are unmapped. When the RAID array controller 204 has determined that all of the source SSDs are unmapped and the destination SSD is mapped, the RAID array controller 104 may be configured to issue an UNMAP command to the destination SSDs 211 and 213. Additionally or alternatively, when the RAID array controller 204 has determined that all of the LBAs associated with the stripe 216 are unmapped, the RAID array controller 204 may consider the resync operation to be complete and may be configured not to issue an UNMAP command. Thus, when all of the source SSDs are unmapped, the RAID array controller 204 may be configured to perform the re-sync operation without reading data of the stripe from the source SSDs 207 and 209, and without writing data to physical blocks corresponding to LBAs of the stripe 216 that are associated with destination SSDs 211 and 213.

With reference to FIG. 1, during a rebuild operation or an exposed mode read operation involving a RAID array configured in a RAID-5 configuration, the RAID array controller 104 may determine data of a stripe corresponding to a failed SSD or a SSD being rebuilt (e.g., a destination SSD). When the RAID array controller has determined that no LBAs of the stripe are unmapped, the RAID array controller 104 may be configured to determine data of the stripe that is associated with a failed SSD or an SSD being rebuilt (e.g., a "destination SSD") by reading and XOR'ing contents of the stripe associated with SSDs of the RAID array 105 that have not failed and/or that are not being rebuilt (e.g., "source SSDs") as described above.

Alternatively or additionally, when the RAID array controller 104 has determined that LBAs of the stripe associated with one source SSD are mapped and the remaining LBAs of the stripe associated with source SSDs are unmapped, the RAID array controller 104 may determine data for the destination SSD without reading the source SSDs that are unmapped and without performing any XOR operations. For example, based on the RAID array controller 104 determining that LBAs of the stripe 116 that are associated with the first source SSD 107 and the second source SSD 111 are unmapped and that LBAs of the stripe 116 that are associated with the third source SSD 113 are mapped, the RAID array controller 104 may consider data of the stripe 116 associated with the third source SSD 113 as corresponding to data of the stripe 116 associated with the destination SSD 109. More particularly, the RAID array controller 104 may read data from the third source SSD 113 into the buffer 106 and may not read data from the first source SSD 107 and the second source SSD 111 into the buffer 106. For a rebuild operation, the RAID array controller 104 may write the contents of the buffer 106 (corresponding to the data read from the third source SSD 113) to the destination SSD 109 (e.g., at LBAs corresponding to the data strip 124). For an exposed mode read operation, the RAID array controller 104 may provide the contents of the buffer 106 (corresponding to the data read from the third source SSD 113) to the host 102. Thus, data of the stripe 116 associated with a failed SSD or an SSD being rebuilt may be determined without reading multiple SSDs and without performing any XOR operations involving data of the stripe 116.

Alternatively or additionally, when the RAID array controller 104 has determined that LBAs of the stripe that are associated with multiple source SSDs are mapped and LBAs of the stripe that are associated with at least one source SSD are unmapped, the RAID array controller 104 may determine data for the destination SSD without reading the at least one source SSD that is unmapped. For example, as described above based on the RAID array controller 104 determining that LBAs of the stripe 116 that are associated with the first source SSD 107 are unmapped and that LBAs of the stripe 116 that are associated with the second source SSD 111 and with the third source SSD 113 are mapped, the RAID array controller 104 determine data of the stripe 116 based on data of the stripe stored at mapped source SSDs 111 and 113 without reading data of the stripe 116 stored at unmapped source SSD 107 as described above. Thus, data of the stripe 116 associated with a failed SSD or an SSD being rebuilt may be determined without reading at least one source SSD.

When the RAID array controller 104 has determined that LBAs of the stripe associated with all of the source SSDs are unmapped, the RAID array controller 104 may be configured to determine data (of the stripe 116) corresponding to the destination SSD 109 without reading any of the source SSDs 107, 111, and 113 and without performing any XOR operations involving data of the stripe 116. Instead of reading and XOR'ing stripe data from the source SSDs 107, 111, and 113, the RAID array controller 104 may determine that data of the stripe 116 corresponds to all zeros based on the RAID array controller 104 determining that all of the LBAs associated with the source SSDs 107, 111, and 113 are unmapped. For an exposed mode read operation, the RAID array controller 104 may provide the data of the stripe 116 (e.g., all zeros) to the host 102. Thus, the RAID array controller 104 may perform the exposed mode operation without reading and/or XOR'ing stripe data from any of the source SSDs 107, 111, and 113. For the rebuild operation, when all of the source SSDs are unmapped and the destination SSD is mapped, the RAID array controller 104 may be configured to issue an UNMAP command to the destination SSD 109. Additionally or alternatively, for the rebuild operation, when all of the LBAs associated with the stripe 116 are unmapped, the RAID array controller 104 may be configured not to issue an UNMAP command. Thus, when all of the source SSDs are unmapped, the RAID array controller 104 may be configured to perform the rebuild operation without writing data to physical blocks corresponding to LBAs of the stripe 116 that are associated with the destination SSD 109.

With reference to FIG. 2, during a rebuild operation or an exposed mode read operation involving a RAID array configured in a RAID-6 configuration, the RAID array controller 104 may determine data of a stripe corresponding to a failed SSD or a SSD being rebuilt (e.g., a destination SSD). When the RAID array controller 204 has determined that no LBAs of the stripe are unmapped, the RAID array controller 204 may determine data of the stripe that is associated with a destination SSD by reading contents of the stripe associated with source SSDs of the RAID array 205, scaling the data read from the source SSDs, and XOR'ing the scaled data.

When the RAID array controller 204 has determined that one or more LBAs of a stripe (e.g., that is the subject of an exposed mode read operation or that is being rebuilt) are unmapped, the RAID array controller 204 may be configured to determine data of the stripe without reading one or more SSDs of the RAID array 205. For example, when the RAID array controller 204 has determined that LBAs of the stripe 216 that are associated with the first source SSD 207 and the second source SSD 211 are unmapped and that LBAs of the stripe 216 that are associated with the third source SSD 213 are mapped, the RAID array controller 204 may proceed as though appropriately scaled data of the stripe 216 associated with the third source SSD 213 corresponds to data of the stripe 216 associated with the destination SSD 209 as described above. When the RAID array controller 204 has determined that LBAs of the stripe associated with multiple source SSDs are mapped and LBAs of the stripe associated with at least one source SSD is unmapped, the RAID array controller 204 may proceed as though scaling and XOR'ing data of the stripe 216 associated with the second source SSD 211 and the third source SSD 213 will produce the data of the stripe 216 associated with the destination SSD 209 as described above.

When the RAID array controller 204 has determined that LBAs of the stripe associated with all of the source SSDs are unmapped, the RAID array controller 204 may be configured to determine data (of the stripe 216) corresponding to the destination SSD 209 without reading any of the source SSDs 207, 211, and 213 and without performing any scaling or XOR operations involving data of the stripe 216. Instead of reading, scaling, and XOR'ing stripe data from the source SSDs 207, 211, and 213, the RAID array controller 204 may determine that data of the stripe 216 corresponds to all zeros based on the RAID array controller 204 determining that all of the LBAs associated with the source SSDs 207, 211, and 213 are unmapped. For an exposed mode read operation, the RAID array controller 204 may provide the data of the stripe 216 (e.g., all zeros) to the host 202. Thus, the RAID array controller 204 may perform the exposed mode operation without reading and/or XOR'ing stripe data from any of the source SSDs 207, 211, and 213. For the rebuild operation, when all of the source SSDs are unmapped and the destination SSD is mapped, the RAID array controller 204 may be configured to issue an UNMAP command to the destination SSD 209. Additionally or alternatively, for the rebuild operation, when all of the LBAs associated with the stripe 216 are unmapped, the RAID array controller 204 may be configured not to issue an UNMAP command. Thus, when all of the source SSDs are unmapped, the RAID array controller 204 may be configured to perform the rebuild operation without writing data to physical blocks corresponding to LBAs of the stripe 216 that are associated with the destination SSD 209.

Figure 4:
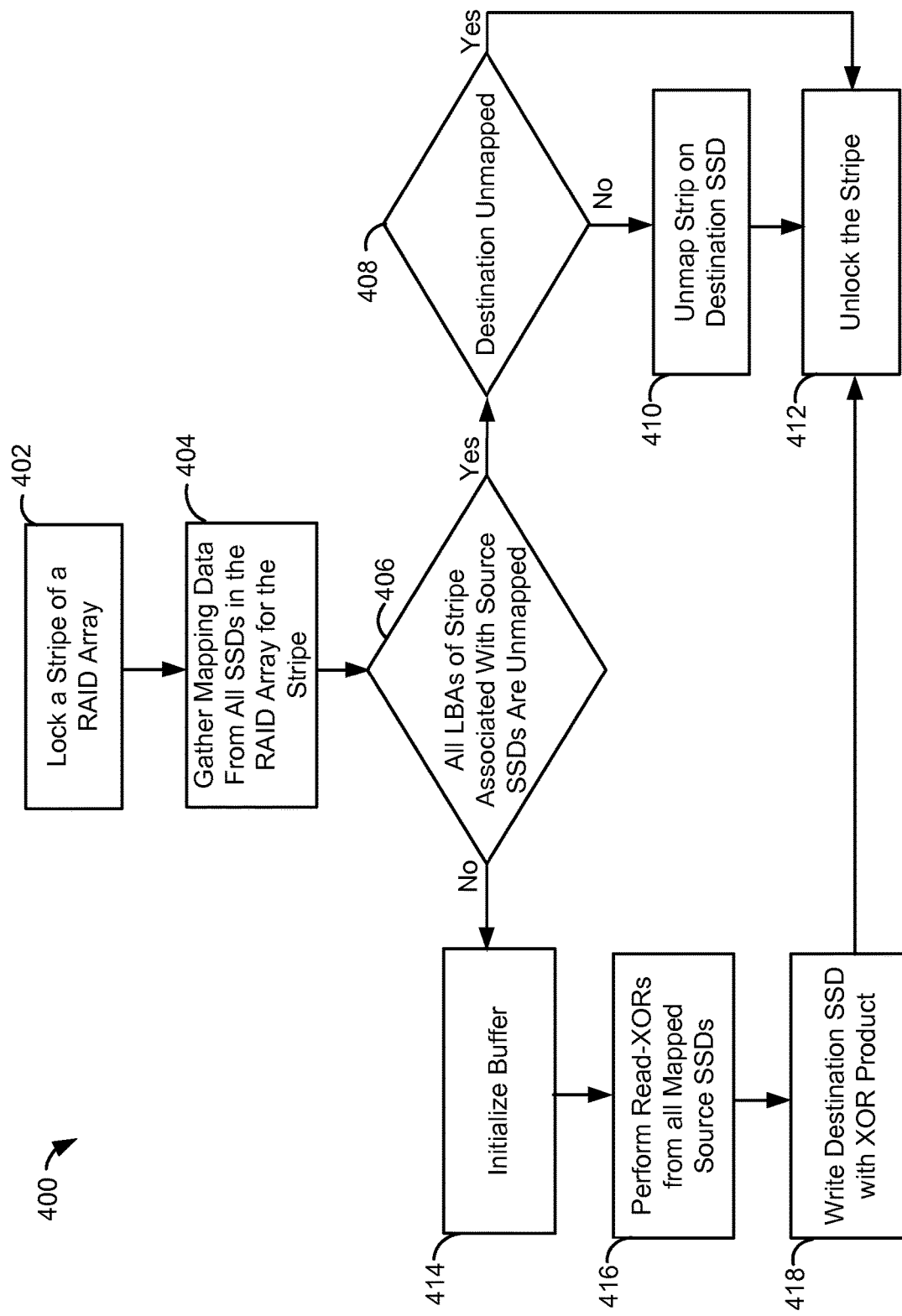
FIG. 4 is a flowchart to illustrate a rebuild operation that determines data based on a mapping status.

Referring to FIG. 4, a first embodiment of a method 400 of a rebuild operation performed based at least in part on whether LBAs of the stripe are unmapped is shown and generally depicted as 400. The method 400 may be executed by the information handling system 100 of FIG. 1. The method 400 may be illustrated with reference to FIG. 1.

The method 400 includes locking a stripe of a RAID array. For example, the RAID array controller 104 may lock the stripe 116 of the RAID array 104 during a rebuild operation of the second source SSD 109. The stripe may be locked using a locking routine (step 402). Once the stripe 116 is locked, a subsequently requested I/O operation may not be performed within the stripe 116 until the rebuild operation is satisfied. Such lock processes may be implemented according to known procedures. Typically such procedures utilize a hash table that receives the I/O requests and orders them appropriately. The lock may be controlled generally by the RAID array controller 104 associated with the disks.

The method 400 includes gathering, at 404, mapping data from all SSDs in the RAID array for the stripe. For example, the RAID array controller 104 may determine whether LBAs of the stripe 116 that are associated with the SSDs 107, 109, 111, and 113 of the RAID array 105 are mapped or are unmapped. For example, as described above, the RAID array controller 104 may issue a GetLBAStatus command to determine whether LBAs of the stripe 116 that are associated with the SSDs 107, 109, 111, and 113 of the RAID array 105 are mapped or unmapped as described above.

The method 400 includes determining whether all source SSDs are unmapped. For example, the RAID array controller 104 may determine whether all LBAs of the stripe 116 that are associated with source SSDs 107, 111, and 113 are unmapped based on the mapping data collected in step 404.

When all of the LBAs of the stripe 116 that are associated with source SSDs are not unmapped, the method 400 includes initializing (at 414) a buffer, performing (at 416) read and/or XORs involving data from mapped source SSDs, and writing (at 418) the destination SSD with the XOR results. The buffer may correspond to the buffer 106, and the buffer 106 may be initialized by the RAID array controller 104.

With reference to step 416, when the mapping data determined at 404 indicates that only one source SSD is mapped, the RAID array controller 104 may read the data of the stripe 116 from the mapped source SSD and determine the data of the stripe corresponding to the destination SSD without performing any XOR operations. For example, as described above, when the RAID array controller 104 has determined that source SSDs 107 and 111 are unmapped and that source SSD 113 is mapped, the RAID array controller 104 may determine that the data of the stripe 116 stored at the mapped source SSD 113 corresponds to data of the stripe 116 corresponding to the destination SSD 109. Thus, the RAID array controller 104 may read the data of the stripe 116 stored at the mapped source SSD 113 into the buffer 106 and not read the data of the stripe 116 stored at the unmapped source SSDs 107 and 111. With reference to step 418, the data in the buffer 106 may be written to the destination SSD 109. Thus, the data of the stripe 116 corresponding to an SSD being rebuilt may be determined without reading all of the source SSDs and without performing any XOR operations on the data of the stripe 116.

With reference to step 416, when the mapping data determined at 404 indicates that multiple source SSDs are mapped, the RAID array controller 104 may read and XOR data of the stripe 116 from mapped source SSDs and may not read data of the stripe 116 from unmapped source SSDs. For example, as described above, when the RAID array controller 104 has determined that source SSD 107 is unmapped and that source SSDs 111 and 113 are mapped, the RAID array controller 104 may determine data of the stripe 116 corresponding to the destination SSD 109 by reading and XOR'ing data of the stripe 116 stored at the mapped source SSDs 111 and 113. Thus, the RAID array controller 104 may determine data of the stripe 116 corresponding to the destination SSD 109 by read the data of the stripe 116 stored at the mapped source SSD 111 into the buffer 106, XOR'ing the contents of the buffer 106 with the data of the stripe 116 stored at the mapped source SSD 113 (e.g., using an on-the-fly XOR engine 114), and writing the result of the XOR operation to the buffer 106. With reference to step 418, the data in the buffer 106 may be written to the destination SSD 109.

Upon writing the destination SSD 109 with the contents of the buffer 106, the RAID array controller may consider the rebuild operation to be complete and may unlock the stripe at 412. Thus, the data of the stripe 116 corresponding to an SSD being rebuilt may be determined without reading all of the source SSDs.

When all of the LBAs of the stripe 116 that are associated with source SSDs are unmapped, the method 400 includes determining, at 408, whether the destination SSD is unmapped. For example, the RAID array controller 104 may determine whether the destination SSD 109 is unmapped based on the mapping data gathered during step 404.

When the destination SSD is determined not to be unmapped, the method 400 includes unmapping, at 410, the stripe on the destination SSD. When the destination SSD is determined to be unmapped, the method 400 does not include unmapping, at 410, the stripe on the destination SSD. For example, when the destination SSD 109 is determined to be unmapped, the RAID array controller 104 may consider the rebuilt operation to be complete and may unlock the stripe 116 at 412. Alternatively, when the destination SSD 109 is determined to be mapped, the RAID array controller 104 may issue an UNMAP command as described above, and may unlock the stripe 116 at 412. Thus, the rebuild operation may be performed without writing to the destination SSD 109.

Although the method 400 is illustrated and described with reference to a RAID-5 configuration, the method 400 may be performed with other RAID configurations, such as RAID 0 or RAID-10 (aka RAID 1+0) without modifying the illustrated flowchart. Additionally, the method 400 may be performed with an array configured in a RAID-6 configuration by scaling data read from SSDs in the array as described above with reference to FIG. 2. Additionally, the method 400 may be performed with an array configured in a RAID-1 configuration without performing any XOR operations. In a RAID-1 configuration, data is not striped, thus, the method 400 may operate with respect to a block (instead of a stripe) of an array configured in a RAID-1 configuration.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor (e.g., processor 103 of FIG. 1 and/or processor 203 of FIG. 2) that includes but is not limited to firmware, resident software, microcode, etc.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A storage device comprising:
   a redundant array of independent disks (RAID) array including a plurality of solid state drives (SSDs);
   a replacement SSD; and
   a RAID array controller coupled to the plurality of SSDs, the RAID array controller configured to:
      unmap all logical block addresses (LBAs) associated with each of the plurality of SSDs;
      unmap all LBAs of the replacement SSD;
      determine whether all LBAs of a first stripe of the RAID array are unmapped;
      upon determining all of the LBAs of a first stripe are not mapped, perform at least one of a read and XOR operation involving data from a source SSD of the plurality of SSDs, and write a destination SSD of the RAID array with XOR results;
      upon determining all of the LBAs of the first stripe are mapped, determine whether all LBAs of a second stripe of the destination SSD are unmapped prior to initiating a rebuild operation of the RAID array; and
      initiate the rebuild operation of the RAID array.

2. The storage device of claim 1, wherein the RAID array controller is configured to determine the data without performing a read operation of the one of the plurality of SSDs when the LBAs are unmapped.

3. The storage device of claim 1, wherein the RAID array controller is configured to determine the data during a rebuild operation of the RAID array.

4. The storage device of claim 1, wherein the RAID array controller is configured to determine the data responsive to an exposed mode read operation.

5. The storage device of claim 1, wherein the RAID array controller is configured to determine the data responsive to a parity re-synch operation.

6. The storage device of claim 1, wherein the RAID array controller is configured to rebuild the first stripe without writing the data to the a destination SSD.

7. The storage device of claim 1, wherein the XOR operation includes using zeros to represent data corresponding to the one or more LBAs.

8. The storage device of claim 1, wherein the RAID array controller comprises a buffer to store results of the XOR operation.

9. The storage device of claim 1, wherein the RAID array controller is configured to issue a GetLBAStatus command to each of the plurality of SSDs and is configured to determine whether the one or more LBAs are unmapped based on a reply to the GetLBAStatus command from each of the plurality of SSDs.

10. A non-transitory computer readable storage medium comprising instructions, that when executed by a processor, cause the processor to:
    initiate a redundant array of independent disks (RAID) controller to unmap all logical block addresses (LBAs) associated with each of a plurality of solid state drives (SSDs);
    upon determining all of the LBAs of a first stripe the RAID array are not mapped, wherein the LBAs are associated with the plurality of SSDs of the RAID array, perform at least one of a read and XOR operation involving data from a source SSD of the plurality of SSDs, and write a destination SSD of a RAID array with XOR results;
    upon determining all of the LBAs of the first stripe are mapped, determine whether all LBAs of a second stripe of the destination SSD are unmapped prior to initiating a rebuild operation of the RAID array; and
    initiating the rebuild operation of the RAID array.

11. The non-transitory computer readable storage medium of claim 10, wherein the instructions, when executed by the processor, cause the processor to determine the data without performing a read operation of the plurality of SSDs.

12. The non-transitory computer readable storage medium of claim 10, wherein the data corresponding to the first stripe is determined during the rebuild operation of the RAID array.

13. The non-transitory computer readable storage medium of claim 10, wherein the data is determined responsive to an exposed mode read operation.

14. The non-transitory computer readable storage medium of claim 10, wherein the data is determined responsive to a parity re-synch operation.

15. The non-transitory computer readable storage medium of claim 10, wherein the instructions, when executed by the processor, cause the processor to rebuild the first stripe without writing data to a destination SSD.

16. The non-transitory computer readable storage medium of claim 10, wherein the instructions, when executed by the processor, cause the processor to determine that one or more LBAs of the second stripe are unmapped using a GetLBAStatus command.

17. The non-transitory computer readable storage medium of claim 10, wherein the RAID array is configured in a RAID-5 configuration.

18. The non-transitory computer readable storage medium of claim 10, wherein the RAID array is configured in a RAID-6 configuration.

\* \* \* \* \*